US007161589B2

(12) United States Patent
Muir

(10) Patent No.: US 7,161,589 B2
(45) Date of Patent: Jan. 9, 2007

(54) AUTOMATIC ELECTRONIC DISPLAY ALIGNMENT

(75) Inventor: David Hugh Muir, Warnersbay (AU)

(73) Assignee: IGT, Reno, NV (US)

( * ) Notice: Subject to any disclaimer, the term of this patent is extended or adjusted under 35 U.S.C. 154(b) by 294 days.

(21) Appl. No.: 10/937,715

(22) Filed: Sep. 9, 2004

(65) Prior Publication Data
US 2005/0030295 A1 Feb. 10, 2005

Related U.S. Application Data

(63) Continuation of application No. 09/901,801, filed on Jul. 10, 2001, now abandoned.

(51) Int. Cl.
G09G 5/00 (2006.01)
(52) U.S. Cl. ........................................ 345/173; 463/36
(58) Field of Classification Search ............. 273/138.1, 273/292, 293, 294, 148; 345/156, 157, 162, 345/172, 173, 178; 463/36, 37, 38
See application file for complete search history.

(56) References Cited

U.S. PATENT DOCUMENTS

| 3,743,883 | A | | 7/1973 | Burns |
| 4,204,193 | A | | 5/1980 | Schroeder |
| 4,234,893 | A | | 11/1980 | Peters |
| 4,286,289 | A | | 8/1981 | Ottesen et al. |
| 4,305,071 | A | | 12/1981 | Bell et al. |
| 4,523,188 | A | | 6/1985 | Huber |
| 4,602,272 | A | | 7/1986 | Duschi |
| 4,630,115 | A | | 12/1986 | Hilsum |
| 4,710,758 | A | | 12/1987 | Mussler et al. |
| 4,806,709 | A | | 2/1989 | Evans |
| 4,815,733 | A | | 3/1989 | Yokoi |
| 4,816,811 | A | | 3/1989 | Bogatin et al. |
| 4,821,029 | A | | 4/1989 | Logan et al. |
| 4,851,616 | A | | 7/1989 | Wales et al. |
| 4,891,508 | A | | 1/1990 | Campbell |
| 4,896,206 | A | | 1/1990 | Denham |
| 4,918,262 | A | | 4/1990 | Flowers et al. |
| 4,929,935 | A | * | 5/1990 | Rysavy et al. ............. 345/178 |
| 4,951,035 | A | | 8/1990 | Beiswenger |
| 5,036,251 | A | | 7/1991 | Lee |
| 5,045,644 | A | | 9/1991 | Dunthorn |
| 5,184,115 | A | | 2/1993 | Black et al. |
| 5,216,504 | A | * | 6/1993 | Webb et al. ................ 348/190 |
| 5,241,139 | A | | 8/1993 | Gungl et al. |
| 5,283,559 | A | | 2/1994 | Kalendra et al. |
| 5,327,164 | A | | 7/1994 | Fagard et al. |

(Continued)

FOREIGN PATENT DOCUMENTS

EP      0 150 903      8/1985

*Primary Examiner*—Nitin Patel
(74) *Attorney, Agent, or Firm*—Marshall, Gerstein & Borun LLP

(57) ABSTRACT

An electronic device includes an electronic display, a touch screen overlay disposed over a display surface of the electronic display and a photosensor disposed adjacent to the touch screen overlay and the display surface. The device further includes a memory and a controller coupled to the electronic display, the touch screen overlay, the photosensor and the memory. The controller is programmed to display an alignment object having a plurality of electronically distinguishable regions on the display surface of the electronic display and to use the photosensor to detect a characteristic of one of the regions of the alignment object. Additionally, the controller is programmed to move the alignment object based on the detected characteristic along a search path toward an aligned condition with respect to the photosensor.

21 Claims, 18 Drawing Sheets

U.S. PATENT DOCUMENTS

| | | |
|---|---|---|
| 5,342,047 A | 8/1994 | Heidel et al. |
| 5,510,833 A | 4/1996 | Webb et al. |
| 5,515,083 A | 5/1996 | Casebolt et al. |
| 5,602,932 A | 2/1997 | Macdonald et al. |
| 5,633,660 A | 5/1997 | Hansen et al. |
| 5,708,460 A | 1/1998 | Young et al. |
| 5,764,223 A | 6/1998 | Chang et al. |
| 5,796,389 A | 8/1998 | Bertram et al. |
| 5,804,773 A | 9/1998 | Wilson et al. |
| 5,910,800 A | 6/1999 | Shields et al. |
| 5,951,397 A * | 9/1999 | Dickinson .................... 463/36 |
| 5,969,756 A * | 10/1999 | Buckley et al. ............. 348/190 |
| 5,977,957 A | 11/1999 | Miller et al. |
| 6,028,595 A | 2/2000 | Shiga |
| 6,052,146 A | 4/2000 | Webb et al. |
| 6,068,552 A * | 5/2000 | Walker et al. ................ 463/21 |
| 6,121,960 A | 9/2000 | Carroll et al. |
| 6,141,000 A | 10/2000 | Martin |
| 6,616,142 B1 * | 9/2003 | Adams ....................... 273/292 |
| 6,848,996 B1 * | 2/2005 | Hecht et al. .................. 463/35 |
| 7,048,275 B1 * | 5/2006 | Adams ....................... 273/292 |

* cited by examiner

800

| (I) | ΔX | ΔY |
|---|---|---|
| 1 | $\phi$ | $-Y_1$ |
| 2 | $-X_1$ | $\phi$ |
| 3 | $\phi$ | $Y_1$ |
| 4 | $X_1$ | $\phi$ |
| 5 | $\phi$ | $-K_1Y_1$ |
| 6 | $-K_1X_1$ | $\phi$ |
| 7 | $\phi$ | $K_1Y_1$ |
| 8 | $K_1X_1$ | $\phi$ |
| 9 | $\phi$ | $-K_2Y_1$ |
| 10 | $-K_2X_1$ | $\phi$ |
| 11 | $\phi$ | $K_2Y_1$ |
| 12 | $K_2X_1$ | $\phi$ |

Where: $\phi \leq K_2 \leq K_1 \leq 1$

& Where: $X_1$ & $Y_1$ may be dynamically adjusted

FIG. 25

AUTOMATIC ELECTRONIC DISPLAY ALIGNMENT

This application is a continuation of U.S. application Ser. No. 09/901,801, filed Jul. 10, 2001 now abandoned, which is incorporated herein by reference in its entirety.

BACKGROUND OF THE INVENTION

This invention relates to automatic alignment of electronic displays, such as, for example, video touch screen displays that are used with electronic casino gaming equipment.

Video touch screens are commonly used in a wide variety of applications and have become increasingly popular for applications where faster, more intuitive user interfaces are desired and/or for applications that would otherwise require an impractically large number of panel-mounted push buttons or controls. For example, U.S. Pat. No. 5,951,397 to Dickenson discloses an electronic gaming machine having a touch screen overlay applied to an outer front surface of a cathode ray tube (CRT) or video display portion of the gaming machine. The gaming machine includes a row of push buttons mounted in a conventional manner on a ledge of the gaming machine so that the push buttons are physically convenient for a player seated on an elevated seat in front of the gaming machine.

The gaming device disclosed by Dickenson allows a player to select one from a plurality of available games such as, for example, blackjack, poker, keno, etc. and also allows the player to select either the conventional push-button controls or the touch screen to, provide inputs to and to control the operation of the game being executed by the gaming machine. However, with some games such as keno, for example, that require more inputs than can be practically provided with push buttons, the gaming machine may require the player to use the touch screen to provide inputs.

When the touch screen is used to provide inputs to the gaming device disclosed by Dickenson, one or more touch fields or soft switches are established within the area of the touch screen overlay. Each of these touch fields or soft switches may correspond to one or more actions or commands that may be performed by processing electronics within the gaming machine. Additionally, graphic indicia and textual information may be displayed on the CRT to indicate to the player the locations of the touch fields and what action or command will result from touching a particular touch field.

As is well known, one important aspect of using a touch screen overlay to provide inputs to a device having an electronic display is maintaining precise physical alignment or correspondence between the touch fields of the touch screen overlay and the displayed graphic indicia and/or text associated with each of the touch fields. For example, if the displayed graphic indicia or text drifts or moves with respect to the front surface of the display, the graphic indicia and/or text may no longer be aligned with or correspond to the desired respective touch fields within the touch screen overlay. Thus, the player of an electronic gaming device that uses a touch screen for inputs may touch the touch screen overlay in an area that appears to correspond to a particular graphic displayed on the front surface of the display to cause a desired action and the touch field associated with the touched location may instead carry out a different or unexpected action or possibly no action at all. As a result, the player, and casino patrons in general, may loose confidence in touch screen-based devices and may avoid playing games that require interaction via a touch screen.

Numerous attempts have been made to improve the alignment between the touch fields within a touch screen overlay and the displayed graphic indicia and/or text that corresponds to each of the touch fields. For example, U.S. Pat. No. 5,796,389 to Bertram et al. discloses a technique for calibrating the relationship between touch screen touch fields and the graphic indicia and/or text displayed on a CRT. As shown in FIG. 7, the technique taught by Bertram et al. displays a plurality of graphic calibration dots throughout the display area of the CRT and asks a user to touch the touch screen overlay at the location of each of these calibration dots. After all of the calibration dots have been touched, the technique taught by Bertram et al. solves a system of equations, which describes the relationships between the output signals generated by the touch screen electronics and the displayed calibration dots, to produce a pair of functions that maps touch screen locations to video display locations within the CRT.

SUMMARY OF THE INVENTION

In accordance with one aspect of the present invention, a method of automatically aligning a visually perceptible display field of an electronic display device having a display surface may display an alignment object within the visually perceptible display field of the electronic display device. The alignment object may include a plurality of electronically distinguishable regions. The method may electronically detect a characteristic of one of the regions within the alignment object and may automatically adjust a position of the visually perceptible display field based on the electronically detected characteristic to move the alignment object toward an aligned condition with respect to the display surface of the electronic display device. Additionally, the method may display the alignment object using two regions with different characteristics and each of the characteristics may be one of a light intensity, a color, a hue, and a pattern.

Further, the method may use a search rule to adjust the position of the display field. In some embodiments the search rule may include a plurality of predetermined search paths within the alignment object and, in other embodiments, the search rule may include a dynamically determined search path within the alignment object.

In accordance with another aspect of the present invention, an electronic device may include an electronic display, a touch screen overlay disposed over a display surface of the electronic display, and a photosensor disposed adjacent to the touch screen overlay and the display surface. The device may further include a controller having a memory and a processor, wherein the controller is coupled to the electronic display, the touch screen overlay and the photosensor.

The controller may be programmed to display an alignment object having a plurality of electronically distinguishable regions on the display surface of the electronic display and may use the photosensor to detect a characteristic of one of the regions of the alignment object. Additionally, the controller may be further programmed to move the alignment object based on the detected characteristic along a search path toward an aligned condition with respect to the photosensor.

The features and advantages of the present invention will be apparent to those of ordinary skill in the art in view of the detailed description of various embodiments, which is made with reference to the drawings, which are described briefly below.

BRIEF DESCRIPTION OF THE DRAWINGS

FIG. 25 is a diagrammatic illustration of a search rules table that may be used by the alignment routine of FIG. 21.

DETAILED DESCRIPTION OF VARIOUS EMBODIMENTS

Figure 1:
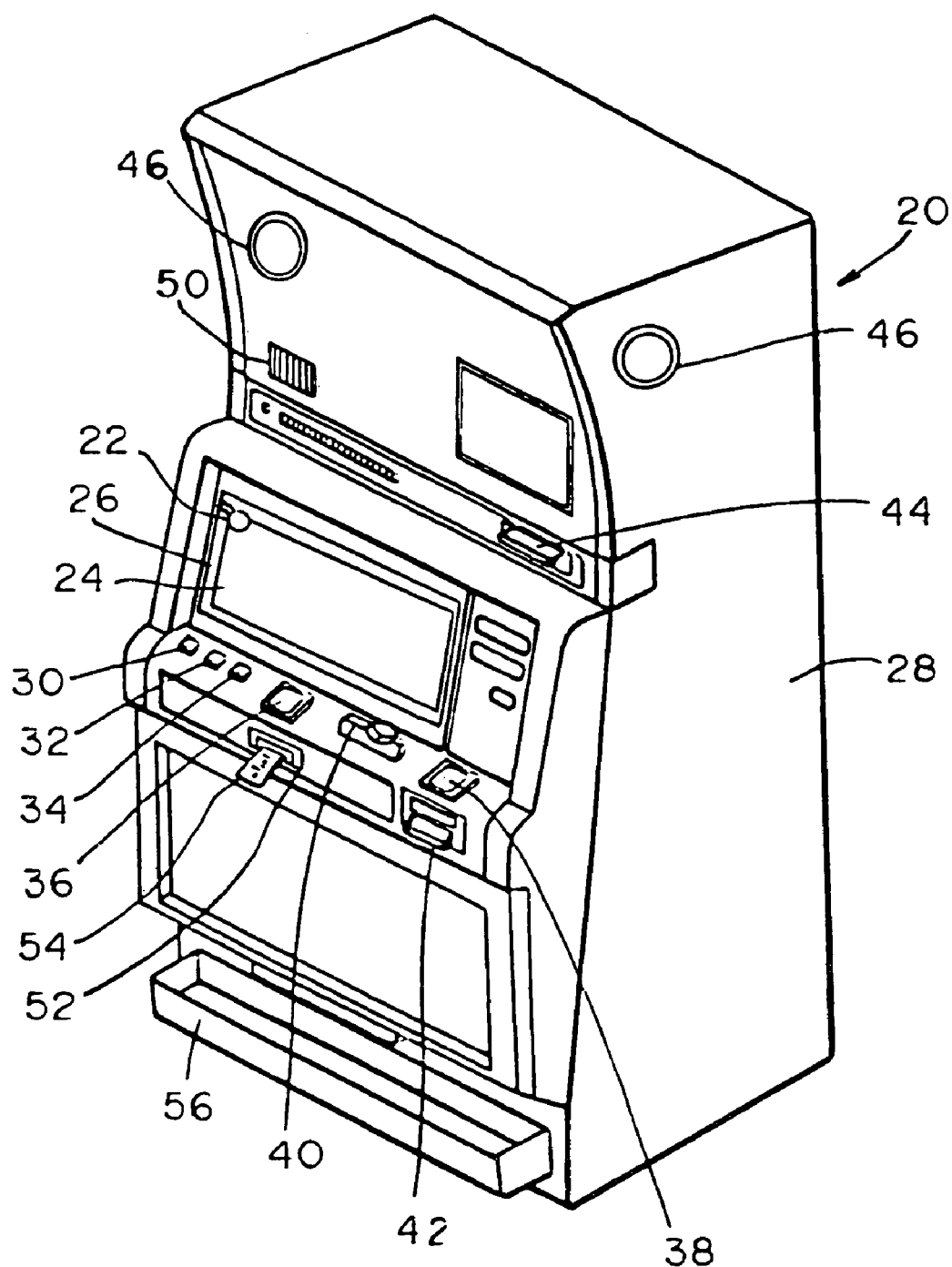
FIG. 1 is a perspective view of one embodiment of an electronic gaming device that uses a photosensor to automatically align a touch screen overlay with underlying graphic and/or textual indicia displayed by the gaming device.

FIG. 1 is a perspective view of one embodiment of a gaming device 20 that uses a photosensor 22 to automatically align a touch screen overlay 24 and underlying graphic and/or textual indicia displayed via an electronic display device 26. It should be understood that while the electronic display alignment technique is described herein in connection with a video-based electronic gaming device, the electronic display alignment technique may be advantageously used with any type of electronic gaming device having a video-based graphical user interface or, more generally, with any device that uses an electronic display to carry out transactions with customers, provide information to users, etc. It should further be recognized that while the electronic display alignment technique is described by way of example as being used with an electronic display device that uses a CRT to display video information, the electronic display calibration technique described herein may also be used with other types of electronic display devices such as plasma displays, liquid crystal displays or any other type of electronic display device.

As shown in FIG. 1, the electronic display device 26 may be disposed on a front side of a cabinet 28, within which the various electrical and mechanical components of the gaming device 20 are mounted. The electronic display device 26 may display graphic and/or textual information associated with one or more video gaming games that a casino customer may play. The displayed graphic and/or textual information may include one or more graphic buttons, shapes or other indicia, each of which corresponds to an action, input, command etc. associated with the play of the game being executed by the gaming device 20 and/or with any other aspect of a user's interaction with the gaming device 20. Each of these graphic buttons or shapes may also correspond to one or more regions or touch fields defined within the touch screen overlay 24 so that when a user touches the overlay 24 within a particular touch field, the action associated with the underlying graphic button or indicia may be performed by the gaming device 20.

In addition to the touch screen overlay 24, the gaming device 20 may also include a variety of other inputs such as electromechanical push buttons 30–38. Each of these push buttons may correspond to one or more game related actions. For example, a user may actuate one or more of these buttons to make wagers and other game-specific selections such as hold or discard decisions, may actuate a button to initiate a video slots spin, etc.

The gaming device 20 may further include a variety of currency- or value-accepting mechanisms that may be disposed on the front of the gaming device 20 or in any other suitable location. These value-accepting mechanisms may include any device that can accept value from a user. As used herein, the term "value" may encompass gaming tokens, coins, paper currency, ticket vouchers and any other suitable object representative of value. By way of example, the value-accepting mechanisms may include a coin acceptor 40 that accepts coins or tokens; a bill acceptor 42 that accepts and validates paper currency; a card or ticket reader 44 that accepts coupons, credit cards, printed cards, smart cards, ticket vouchers, etc.; and any other device that may accept a medium of value.

The gaming device 20 may include additional features to enhance a user's game-playing experience. For example, one or more audio speakers 46, a sound-generating circuit 48 (FIG. 2) and an aroma dispenser 50 may be positioned on the cabinet 28 as shown in FIG. 1 or in any other suitable location. The audio speakers 46 may provide various sounds relevant to the video gambling game being played on the gaming device 20. For example, the sound-generating circuit 48 may provide electrical signals to the speakers 46 to generate sounds such as the noise of spinning slot machine reels, a dealer's voice, music, announcements or any other desired sounds. The aroma dispenser 50, is shown in FIG. 1 as being mounted above the electronic display device 26 but may be mounted in any other suitable location. Commercially available aroma dispensers, which may be used for the aroma dispenser 50, may be manufactured by MicroScent or DigiScents. Of course, any other suitable aroma dispenser made by any other manufacturer may be used instead.

The gaming device 20 may also include a printer 52 disposed on the front of the gaming device 20 or in any other suitable location. The printer 52 may be used, for example, to print a voucher 54, which is well known in the art and, thus, will not be described in greater detail herein. The gaming device 20 may also include a payout tray 56 such as, for example, the type of payout tray commonly provided on slot machines.

Figure 2:
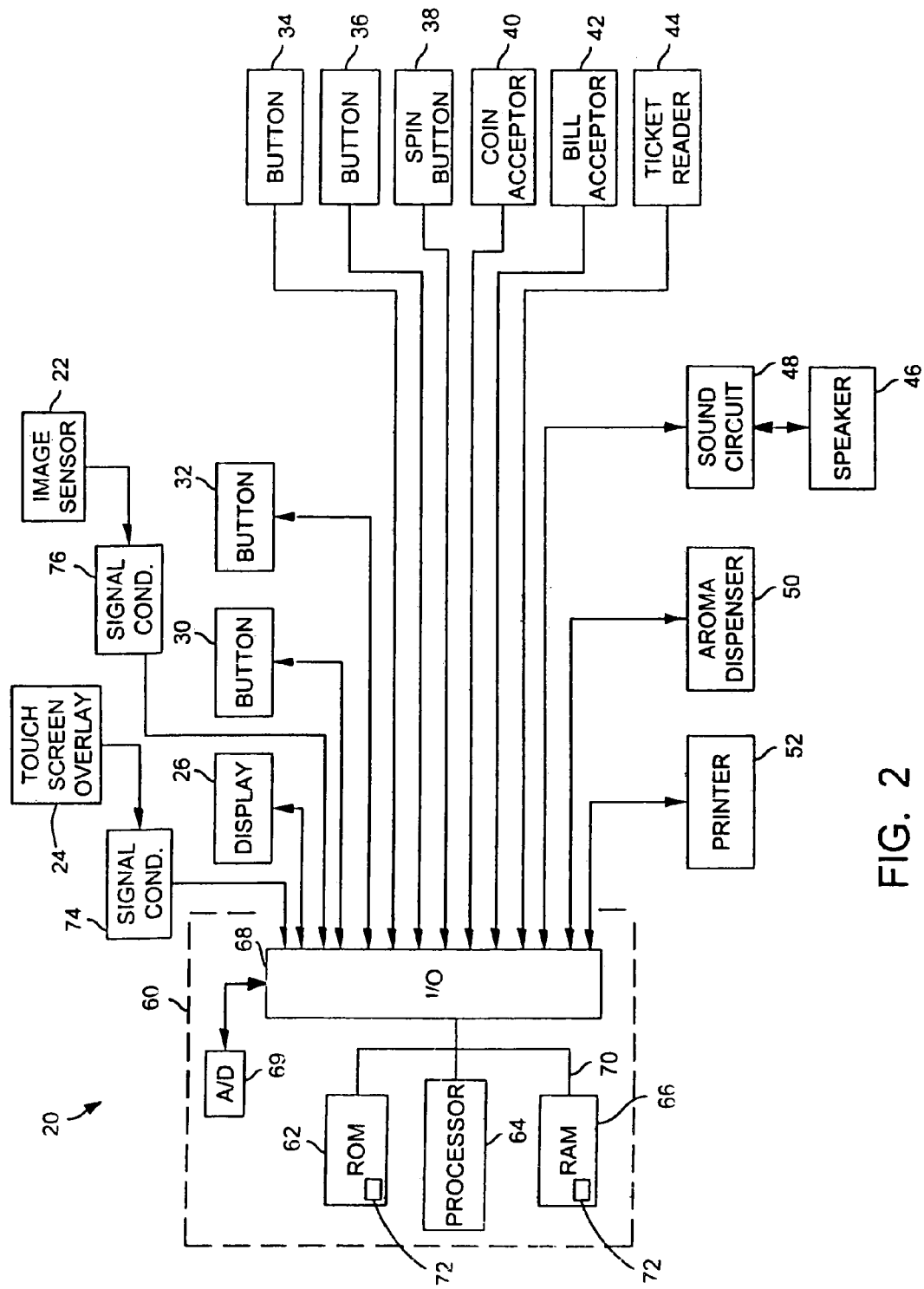
FIG. 2 is an exemplary schematic block diagram of the electronic gaming device shown in FIG. 1.

FIG. 2 is an exemplary schematic block diagram of a number of components that may be incorporated within the gaming device 20. As shown in FIG. 2, the gaming device 20 may include a controller 60 that may include a read-only memory (ROM) 62, a processor 64, a random-access memory (RAM) 66, an input/output (I/O) circuit 68, and an analog-to-digital (A/D) converter 69, all of which may be communicatively coupled via an address/data bus 70. It should be appreciated that although only one processor 64 is shown, the controller 60 could include multiple processors 64. Likewise, the memory within the controller 60 could include multiple RAMs 66 and multiple ROMs 62. Additionally, the RAM(s) 64 and ROM(s) 62 may, for example, be implemented using semiconductor memories, magnetically readable memories, optically readable memories, or any other suitable memory devices. Further, although the I/O circuit 68 is shown as a single block, the I/O circuit 68 may instead include a number of different types of I/O circuits that may cooperate to carry out any desired I/O functions.

FIG. 2 also illustrates that the various components of the gaming device 20 shown in FIG. 1 may be connected to the I/O circuit 68 via respective direct lines or conductors. Of course, different connection schemes could be used instead. For example, one or more of the components shown in FIG. 2 could be connected to the I/O circuit 68 via a common bus or any other suitable data link that is shared by a number of components. Furthermore, some of the components could be directly connected to the microprocessor 64 without passing through the I/O circuit 68.

One or more computer programs and/or routines 72 may be stored within one or more memories (e.g., the RAM(s) 66, the ROM(s) 62, etc.) of the controller 60 to carry out the methods described herein. As is well known, by storing the computer programs and/or routines 72 in the memories 62 and/or 66, various portions of the memories 62 and/or 66 are physically configured, either magnetically (e.g., in the case of a magnetic memory), electrically (e., in the case of a semiconductor memory) or structurally (e.g., in the case of an optical memory), in accordance with the instructions included within the programs or routines 72.

The computer programs or routines 72 may be implemented using any suitable programming techniques and languages. For example, the routines 72 may be implemented using a high-level computer language such as C, C+, Basic, etc. or any low-level, assembly or machine language. Additionally, one or more of the computer programs or routines 72 may be stored in a remote location (i.e., outside of the gaming device 20) and may control the operation of the gaming device 20 from the remote location. Alternatively, the routines 72 may be downloaded from a remote location and stored and executed within the gaming device 20. In any event, any such remote location may be communicatively coupled to the gaming device 20 via a hardwired link, a wireless communication link, an Internet connection, etc.

FIG. 2 also shows that the touch screen overlay 24 and the photosensor 22 are coupled to the controller 60 via respective signal conditioning blocks 74 and 76. The signal conditioning blocks 74 and 76 may include amplifiers, attenuators, level shifters, electronic filters (i.e., high pass, low pass, and/or bandpass filters), protective circuitry such as electrostatic discharge protection or surge protection, or any other signal conditioning function needed to effectively interface the touch screen overlay 24 and the photosensor 22 to the controller 60. Although the signal conditioning blocks 74 and 76 are shown as separate blocks, it should be recognized that a single block or more than two blocks may be used instead to carry out the desired signal conditioning functions.

Figure 3:
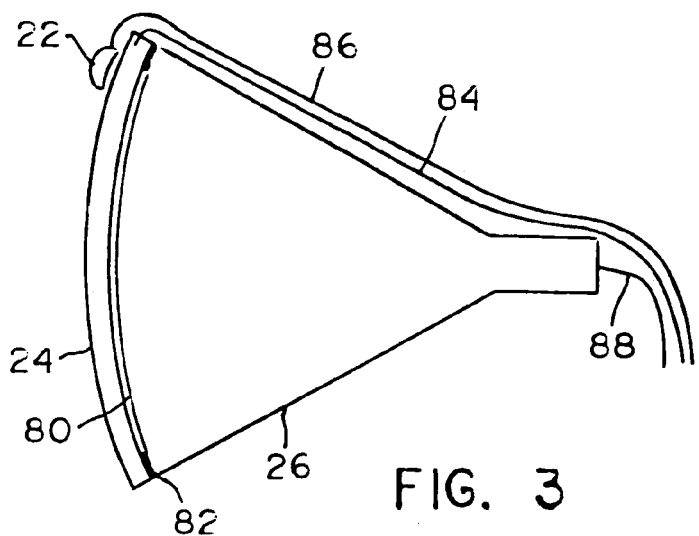
FIG. 3 is side elevational view generally illustrating one manner in which the photosensor shown in FIG. 1 may be positioned with respect to the video display and the touch screen overlay shown in FIG. 1.

FIG. 3 is side elevational view generally illustrating one manner in which the photosensor 22 shown in FIG. 1 may be positioned with respect to a display surface 80 of the display device 26 and the touch screen overlay 24. As shown in FIG. 3, the touch screen overlay 24 may be affixed to the display surface 80 of the display device 26 using a layer of adhesive 82 that extends around an outer periphery of the display device 26. However, any other method of mechanically fixing the position of the touch screen overlay 24 with respect to the display surface 80 of the display device 26 may be used instead. As is also shown in FIG. 3, the touch screen overlay 24 and the photosensor 22 may be connected via wires 84 and 86 to the signal conditioning blocks 74 and 76 (FIG. 2). Similarly, the display device 26 may be connected via wires 88 to the controller 60. The photosensor 22 may be affixed to the touch screen overlay 24 (and, thus, to the display device 26) using an adhesive. However, any other method of affixing the photosensor 22 to the display device 26 may be used instead. Preferably, but not necessarily, the photosensor 22 is positioned over an area of the display surface 80 of the display device 26 so that it will be minimally intrusive with respect to graphic and/or textual information displayed thereon in connection with the operation of the gaming device 20.

Figure 4:
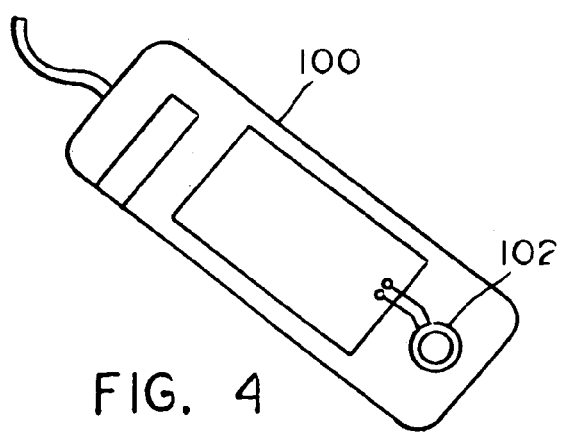
FIG. 4 is an exemplary plan view of a photosensor having a single sensing element that may be used with the gaming device shown in FIG. 1.
Figure 5:
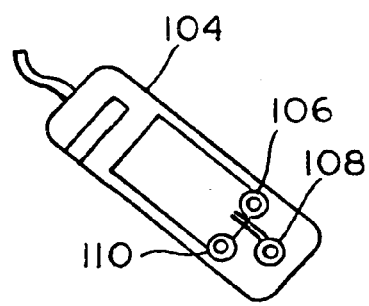
FIG. 5 is an exemplary plan view of a photosensor having multiple sensing elements that may be used with the gaming device shown in FIG. 1.
Figure 6:
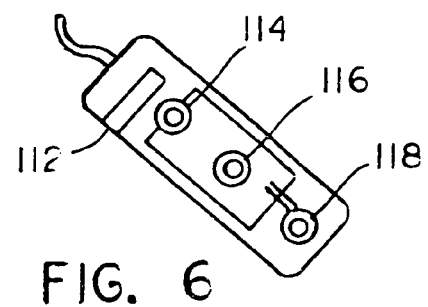
FIG. 6 is an exemplary plan view of another photosensor having multiple sensing elements that may be used with the gaming device shown in FIG. 1.

FIGS. 4–6 are exemplary plan views of photosensors that may be used for the photosensor 22 shown in FIGS. 1–3. In particular, FIG. 4 illustrates a photosensor 100 that has a single detection element 102, FIG. 5 illustrates a photosensor 104 having three detection elements 106–110 spaced from each other in an approximately triangular layout and FIG. 6 illustrates a photosensor 112 having three detection elements 114–118 spaced from each other to form an approximately linear array along the longitudinal axis of the sensor 112. Of course, more or fewer detection elements may be used if desired and the detection elements may be arranged as generally shown in FIGS. 4–6 or using any other suitable geometry (e.g., circular, rectangular, an irregularly shaped geometry, etc.). Each of the detection elements 102, 106–110 and 114–118 may have a field of view that encompasses a single pixel of the display device 26 or, alternatively, may have a field of view encompassing a plurality of pixels of the display device 26. In any case, the field of view of each of the sensors 100, 104 and 112 is determined by the number of detection elements used, the field of view of each of the detection elements and the manner in which the detection elements are arranged (i.e., the layout).

Generally speaking, the sensors 100, 104 and 112 use detection elements that are photosensitive and which provide varying electrical output signals in response to changes in the intensity, color, hue, etc. of an impinging light source. Thus, if one or more of the sensors 100, 104 and 112 are used for the photosensor 22 (FIGS. 1–3), light emitted by pixels of the display device 26 that are within the field of view of the photosensor 22 may cause the photosensor 22 to generate responsive electrical signals, which may be provided to the controller 60 (FIG. 2) via the signal conditioning block 76 (FIG. 2) and the wires 86 (FIG. 3). By way of example only, the sensors 100, 104 and 112 may be charge coupled devices (CCDs), which are well known in the art and, thus, will not be described in detail herein. However, the sensors 100, 104 and 112 (and the photosensor 22) may use any other suitable photo-detection technology.

Figure 7:
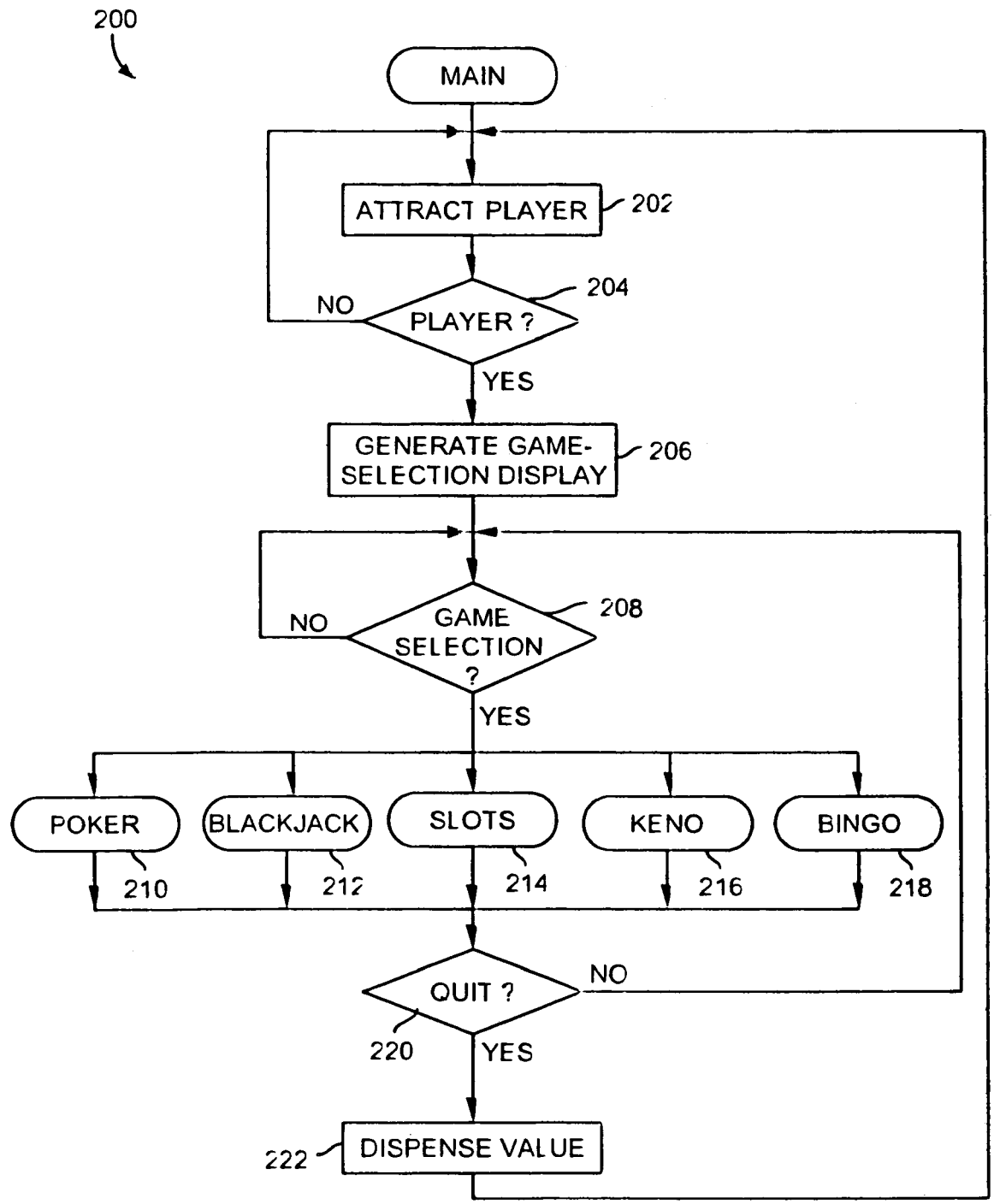
FIG. 7 is an exemplary flow diagram of a main routine that may be performed by the controller shown in FIG. 2.

Before discussing the manner in which the electronic display alignment technique described herein may be used to align the display device 26, a general discussion of how users or players interact with the various value-accepting devices 40–44, input devices 30–38 and the touch screen overlay 24 is provided below. FIG. 7 is an exemplary flow diagram depicting a main operating routine 200 that may be stored in the memory of the controller 60. As shown in FIG. 7, the main routine 200 may begin execution at block 202 at which player attraction graphics may be displayed by the display device 26 (FIGS. 1–3) of the gaming device 20. Player attraction graphics may include a scrolling list of games that may be played on the electronic gaming device 20, cartoons, videos, textual information, etc. While player attraction graphics are being displayed, the controller 60 may intermittently determine if a player is detected at block 204. Block 204 may make this determination by, for example, polling the value-accepting devices 40–44 and/or the push buttons 30–38. Alternatively, the value-accepting devices 40–44 and the push buttons 30–38 may be programmed to notify the controller 60 when valid currency is inserted or player contact is detected, respectively. Additionally, block 204 may use the controller 60 to process inputs from the touch screen overlay 24 to determine whether a player has touched the display device 26 of the gaming device 20 in an attempt to initiate a gaming session. Block 204 may determine that a player has touched the display device 26 if any region of the touch screen overlay 24 is touched by a player or, alternatively, may determine that a player has touched the display device 26 only if the player touches a particular region or regions within the touch screen overlay 24. In any case, as long as no player is detected by block 204, the attraction graphics may be displayed by block 202.

At block 206, a game-selection graphic may be displayed to the player via the display device 26. The game-selection graphic may include a list of video gambling games that may be played on the gaming device 20. Additionally, the player may be prompted to deposit value into the gaming device 20 via one of the value-accepting devices 40–44. The routine 200 may remain at block 206 until the player deposits at least the minimum value required to initiate a gaming session. Of course, any value that the player deposits may be stored as credit.

In response to the detection of a deposit of currency or other value by the player, the controller 60 may cause a message to be displayed on the display device 26 that prompts the player to select one of a plurality of video gambling games. Upon detection of a player game selection at block 208, the controller 60 may cause one of a number of gaming routines to be performed, thereby enabling the player to play the selected gaming routine. For example, the gaming routines could include a video poker routine 210, a video blackjack routine 212, a video slots routine 214, a video keno routine 216 and a video bingo routine 218. Although five video gaming routines are shown in FIG. 7, a different number of routines could be included to allow play of more or fewer games and/or different games such as for example, a slot machine with mechanical wheels.

After one of the routines 210–218 has been performed to allow the player to play a game, block 220 may be used to determine whether the player wishes to terminate the current gaming session on the gaming device 20 or to select another game. If the player indicates a desire to terminate the current session by, for example, by touching the touch screen overlay 24 in a region corresponding to a quit graphic displayed on the underlying display device 26, the controller 60 may determine that a touch field associated with termination of the current gaming session has been touched and may dispense value to the player at block 222 based on the outcome of the games played by the player. The controller 60 may then return control to block 202 to cause the display device 26 to display attraction graphics to attract another player. If block 220 determines that the player does not want to terminate the current gaming session, the routine 200 returns to block 208 to enable the player to make another game selection.

Figure 8:
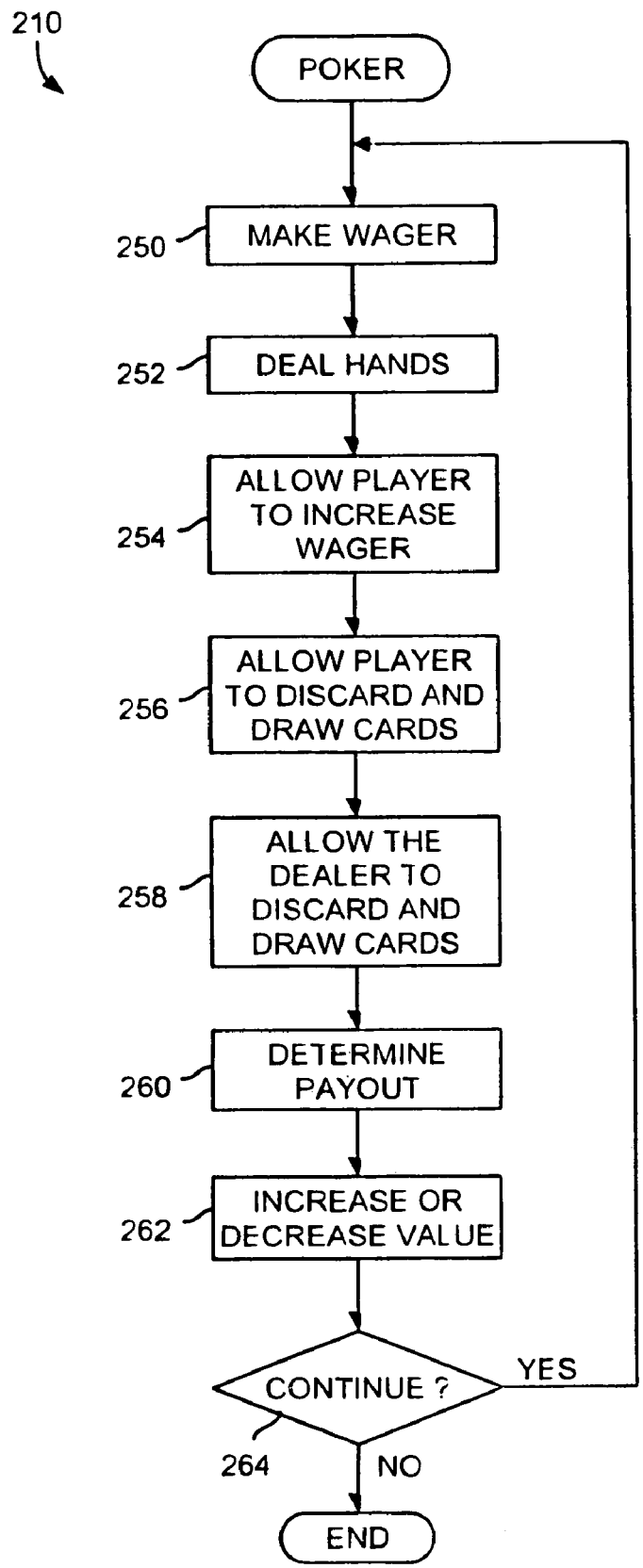
FIG. 8 is an exemplary flow diagram of a video poker routine that may be performed by the controller shown in FIG. 2.

FIG. 8 is an exemplary flow diagram of the video poker routine 210 shown in FIG. 7. As shown in FIG. 8, at block 250 the controller 60 may cause a display to be generated on the display device 26 to prompt the player to make a wager. After a wager is entered, block 252 may cause the controller 60 to display (via the display device 26) a pair of virtual poker hands of cards that have been dealt to the player and the dealer. After the virtual hands have been displayed, the player may have an opportunity at block 254 to increase the initial wager made at the block 250. At block 256, the player may be allowed to discard and draw new cards in an attempt to improve the player's poker hand, and at block 258 the dealer (which may be, for example, the electronic gaming device 20) may be allowed to discard and draw new cards in an attempt to improve the dealer's poker hand.

At block 260, the controller 60 may determine the outcome of the poker game and a corresponding payout. If the player has won the game (i.e., the player's hand is better than the dealer's hand), the payout will be positive. If the player has not won the game, the player's total wager may be forfeited. At block 262, the controller 60 may increase or decrease the player's value based on the results of the poker game as determined at block 260. At block 264, the controller 60 may cause a message to be displayed on the display device 26 asking whether the player desires to continue playing the video poker game. If the player desires to continue play, the routine 210 may return to block 250. If the player does not desire to continue play, the poker routine 210 may end and the controller 60 may cause block 220 of FIG. 7 to be performed.

Figure 9:
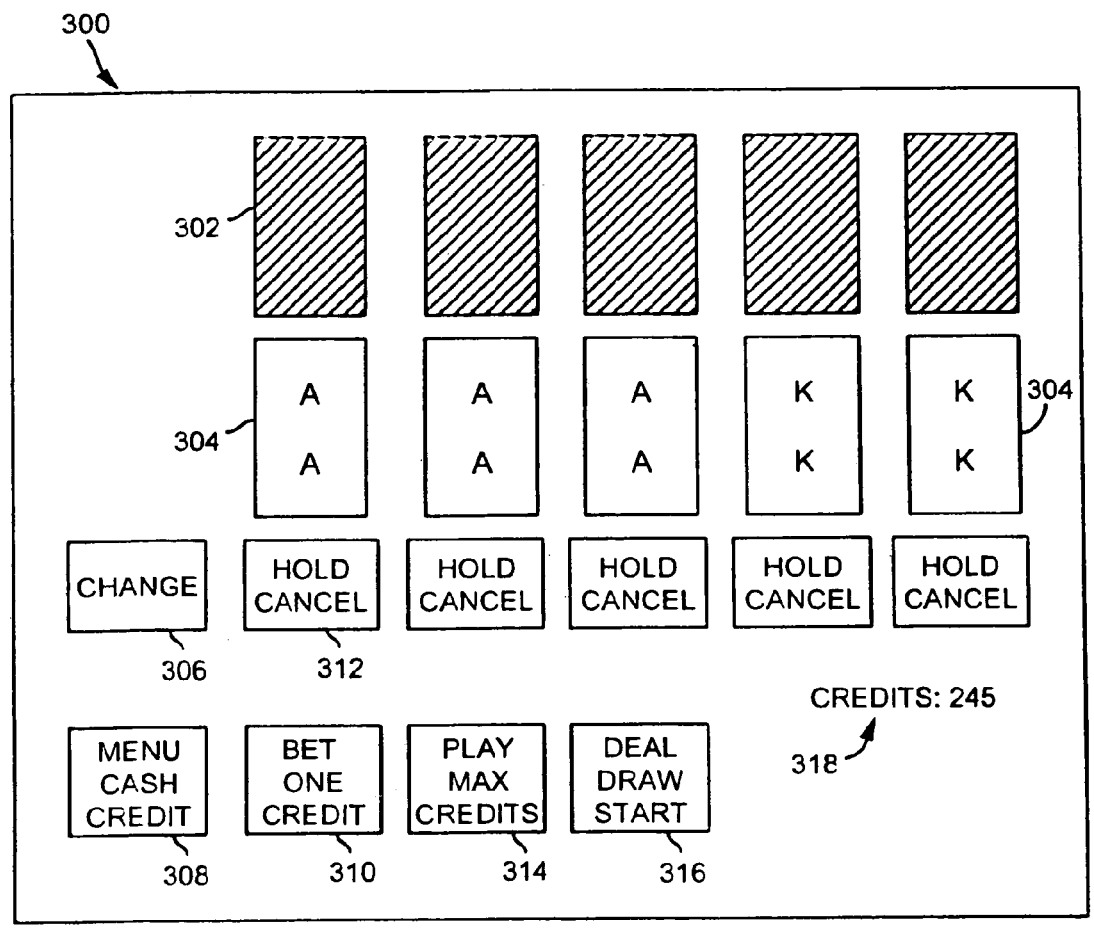
FIG. 9 is an exemplary illustration of a visual display that may be displayed by the gaming device of FIG. 1 when the controller of FIG. 2 performs the video poker routine shown in FIG. 8.

FIG. 9 is an exemplary display 300 that may be shown on the display device 26 during performance of the video poker routine 210. As shown in FIG. 9, the display 300 may include video images representative of a plurality of cards 302 in a dealer's hand, which may be shown face down, and a plurality of cards 304 in a player's hand, which may be shown face up. To allow the player to control the play of the video poker game, a plurality of player-selectable button graphics may be displayed. For example, button graphics for change 306, menu/cash/credit 308 and bet one credit 310 may be displayed. Further, button graphics for hold/cancel 312 may be displayed, each of which may pertain to a particular one of the player's cards 304. Button graphics for play max credits 314 and deal/draw/start 316 may also be displayed. A graphic 318 representing the number of player credits may also be displayed to inform the player of the number of credits remaining. Preferably, but not necessarily, a particular touch field or region of the touch screen overlay 24 uniquely corresponds to and is physically aligned with each of the graphic images displayed within the display 300. In other words, a one-to-one correspondence exists between the touch fields and the graphic images. As a result, when a player touches the touch screen overlay 24 in, for example, the touch field corresponding to the change button graphic 306, the controller 60 may perform actions associated with the change button graphic 306.

Figure 10:
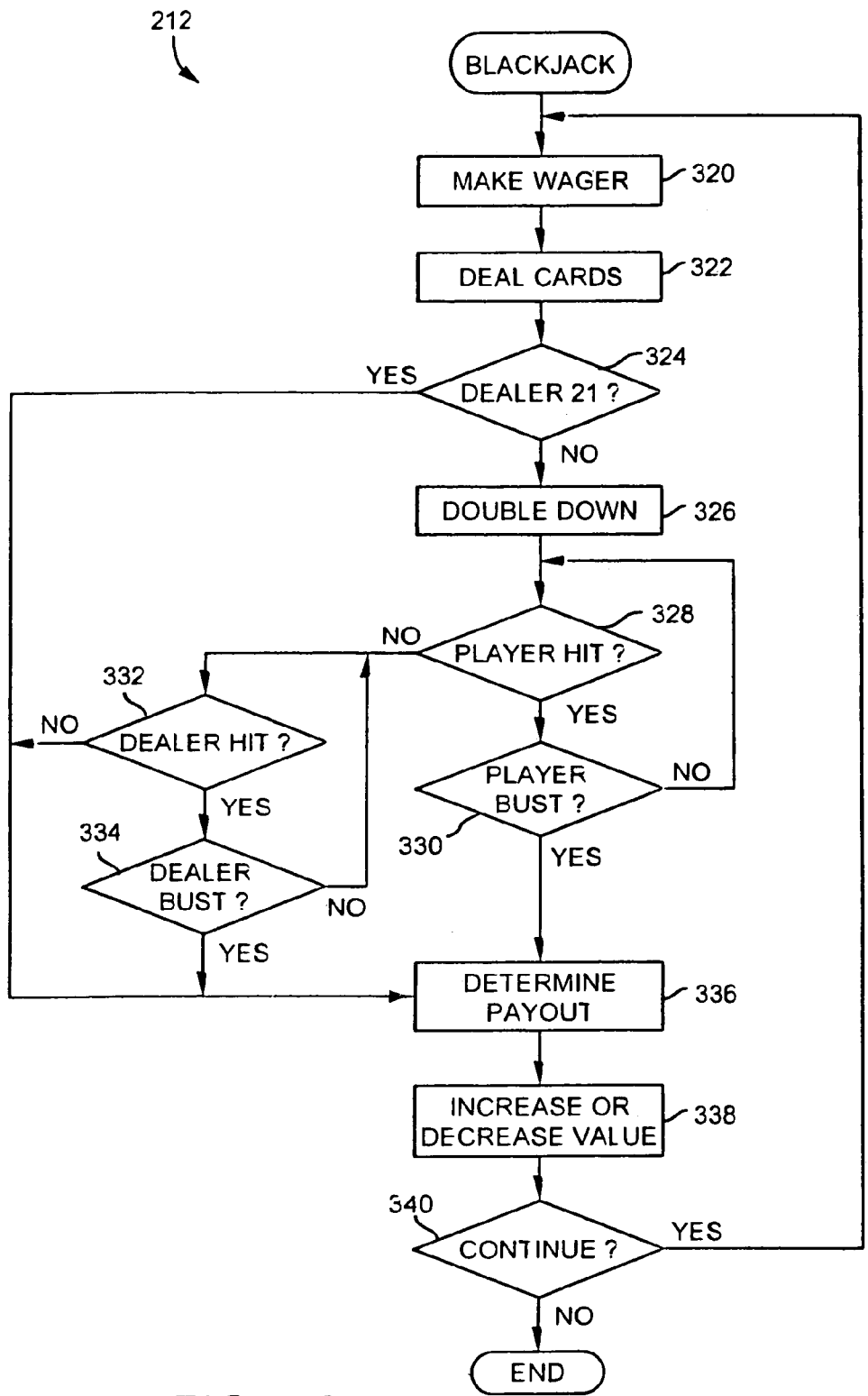
FIG. 10 is an exemplary flow diagram of a video blackjack routine that may be performed by the controller shown in FIG. 2.

FIG. 10 is an exemplary flow diagram of the video blackjack routine 212 shown in FIG. 7. As shown in FIG. 10, the video blackjack routine 212 may begin at block 320 at which a player may make a wager on the outcome of the blackjack game. After the player has made a wager, at block 322 the controller 60 may cause virtual cards to be "dealt" to both the player and the dealer (which may be the gaming unit 20), against which the player is playing.

After the cards are dealt, at block 324 the controller 60 may determine whether the dealer has a hand that totals twenty-one. If the dealer's hand does not total twenty-one, at block 326 the controller 60 may cause the display device 26 to generate a display asking whether the player would like to double down. At block 328, the controller 60 may allow the player to be "hit" (i.e., dealt an additional virtual card). If the player is hit, block 330 may determine if the player has "bust" (i.e., has exceeded twenty-one). If the player has not bust, block 328 may be performed again to allow the player to be "hit" again.

If the player decides not to hit, at block 332 the controller 60 may determine whether the dealer wants to be hit. If the dealer hits, at block 334 the controller 60 may determine whether the dealer has bust. If the dealer has not bust, block 332 may be performed again to allow the dealer to be "hit" again. If the dealer decides not to hit, at block 336 the controller 60 may determine the outcome of the blackjack game and a corresponding payout. For example, the controller 60 may determine which of the player or the dealer has the higher hand that does not exceed twenty-one.

At block 338, the controller 60 may increase or decrease the player's value based on the results of the blackjack game as determined at block 336. At block 340, the controller 60 may cause a message to be displayed on the display device 26 asking whether the player desires to continue playing the video blackjack game. If the player wishes to continue, the blackjack routine 212 may branch back to block 320. If not, the blackjack routine 212 may end and the controller 60 may cause block 220 of FIG. 7 to be performed.

Figure 12:
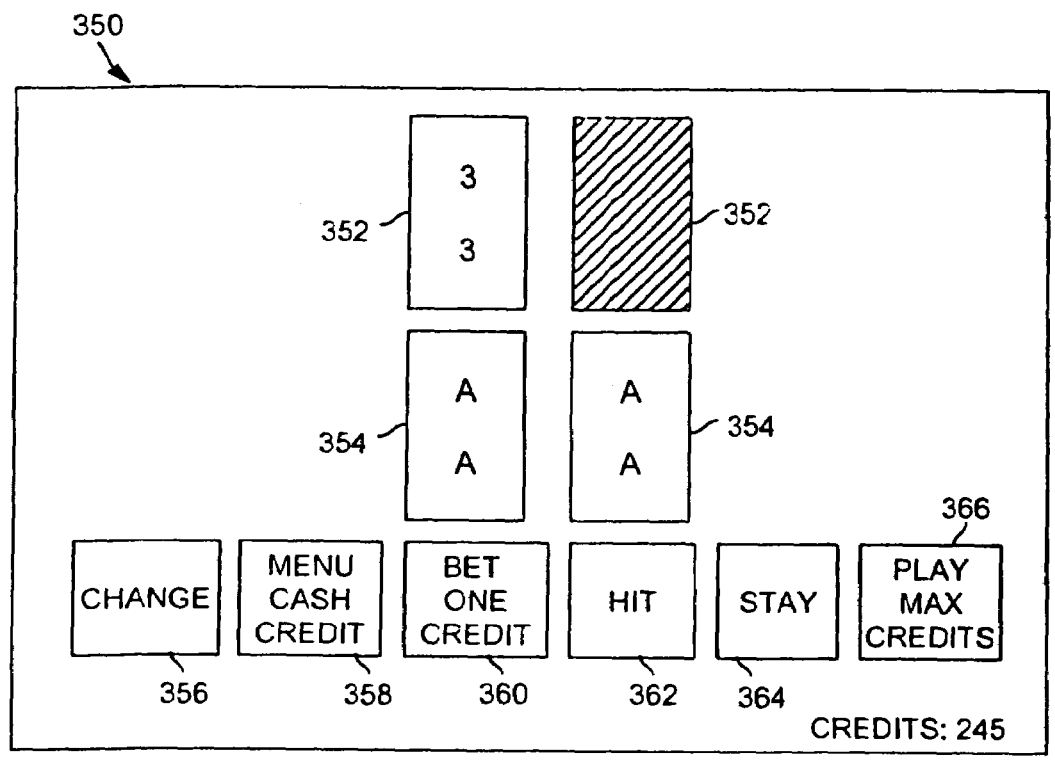
FIG. 12 is an exemplary illustration of a visual display that may be displayed by the gaming device of FIG. 1 when the controller of FIG. 2 performs the video blackjack routine shown in FIG. 10.

FIG. 12 is an exemplary display 350 that may be shown on the display device 26 during performance of the video blackjack routine 212. As shown in FIG. 12, the display 350 may include video images representative of a plurality of cards 352 that form a dealer's blackjack hand and a plurality of cards 354 that form the player's blackjack hand. To allow the player to control the play of the video blackjack game, a plurality of player-selectable button graphics may be displayed. For example, button graphics for change 356, menu/cash/credit 358, bet one credit 360, hit 362, stay 364 and/or play max credits 366 may be provided.

Figure 11:
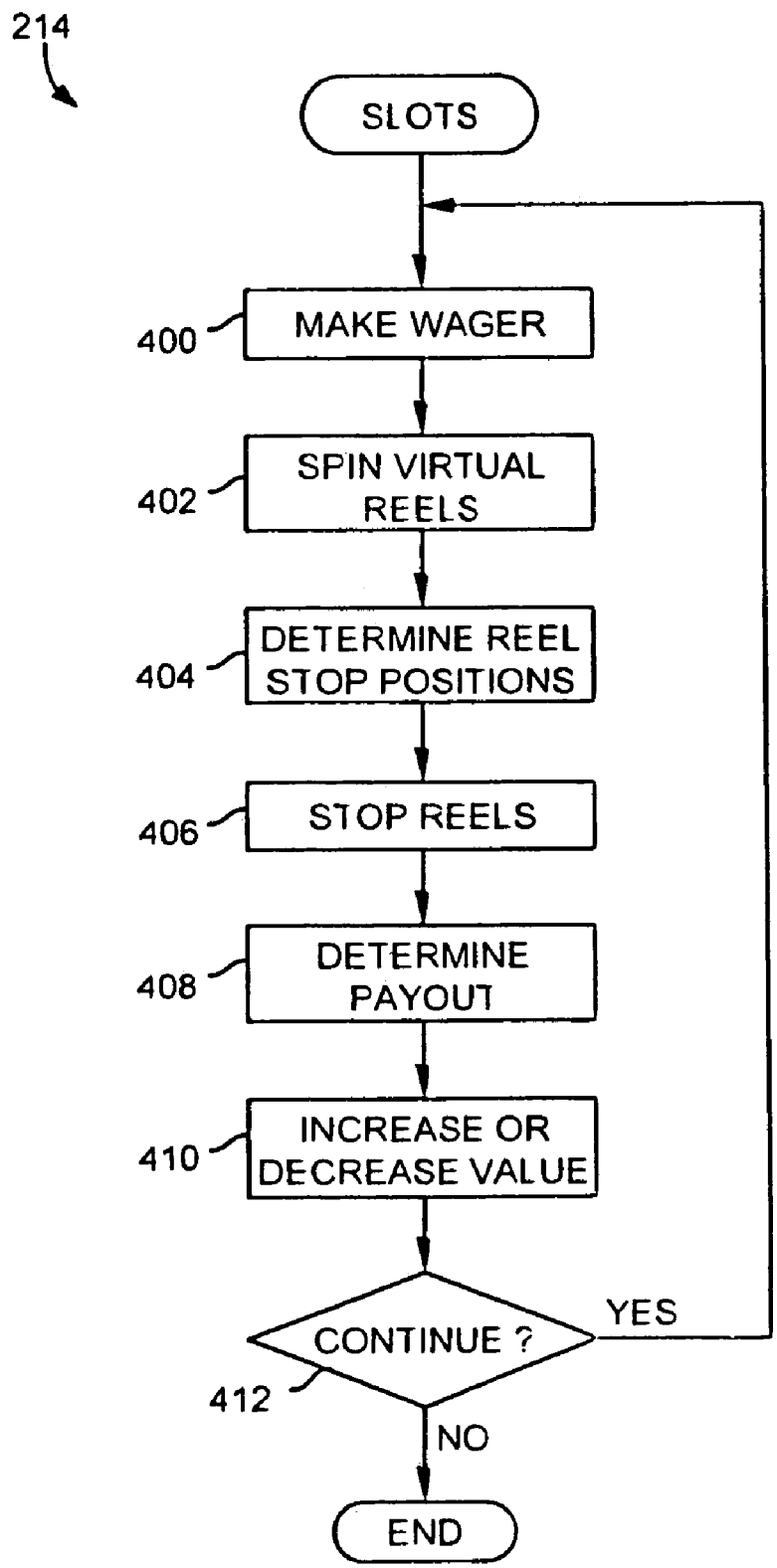
FIG. 11 is an exemplary flow diagram of a video slots routine that may be performed by the controller shown in FIG. 2.

FIG. 11 is an exemplary flow diagram of the video slots routine 214 shown in FIG. 7. As shown in FIG. 11, the video slots routine 214 may begin at block 400 at which a player may make a wager. After the player has made a wager, at block 402 the controller 60 may cause an image of a plurality of spinning slot machine wheels to be generated on the display device 26. While the virtual reels are spinning, at block 404 the controller 60 may determine the symbols on which the various virtual reels are to be stopped, such as by randomly selecting one or more numbers from which the reel stop positions are determined. At block 406, the controller 60 may cause the display device 26 to display a sequence of images that simulates the sequential stopping of each of the virtual reels. The virtual reels may be stopped from left to right, from the perspective of the player, or in any other manner or sequence. At block 408, the controller 60 may evaluate the game outcome based on the positions at which the virtual reels stopped and determine the payout to which the player is entitled. For example, if the virtual reels have stopped on high payout symbols, the player may receive a large payout. If, however, the virtual reels have stopped on symbols having no payout, the player loses the money that was wagered at block 400.

At block 410, the controller 60 may increase or decrease the player's value based on the results of the video slots game as determined at block 408. At block 412, the controller 60 may cause a message to be displayed on the display device 26 asking whether the player desires to continue playing the video slots game. If the player wishes to continue, the routine 214 may branch back to block 400. If not, the video slots routine 214 may end and the controller 60 may cause block 220 of FIG. 7 to be performed.

Figure 13:
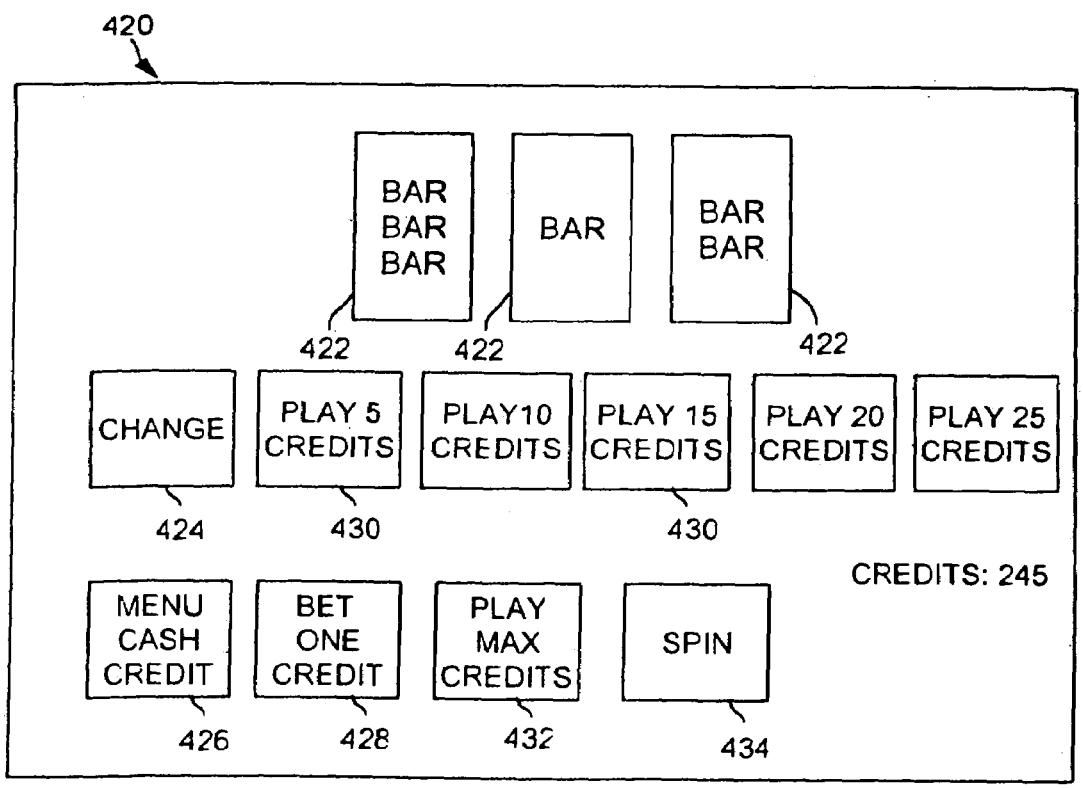
FIG. 13 is an exemplary illustration of a visual display that may be displayed by the gaming device of FIG. 1 when the controller of FIG. 2 performs the video slots routine shown in FIG. 11.

FIG. 13 is an exemplary display 420 that may be shown on the display device 26 during performance of the video slots routine 214. As shown in FIG. 13, the display 420 may include video images representative of a plurality of virtual slot machine reels 422. While three such virtual slot machine reels 422 are shown in FIG. 13, it should be understood that any number of virtual reels could be used instead. To allow the player to control the play of the video slot machine, a plurality of player-selectable button graphics may be displayed. For example, button graphics for change 424, menu/cash/credit 426, bet one credit 428, bet various numbers of credits 430, play max credits 432, and/or spin reels 434 may be displayed.

Figure 14:
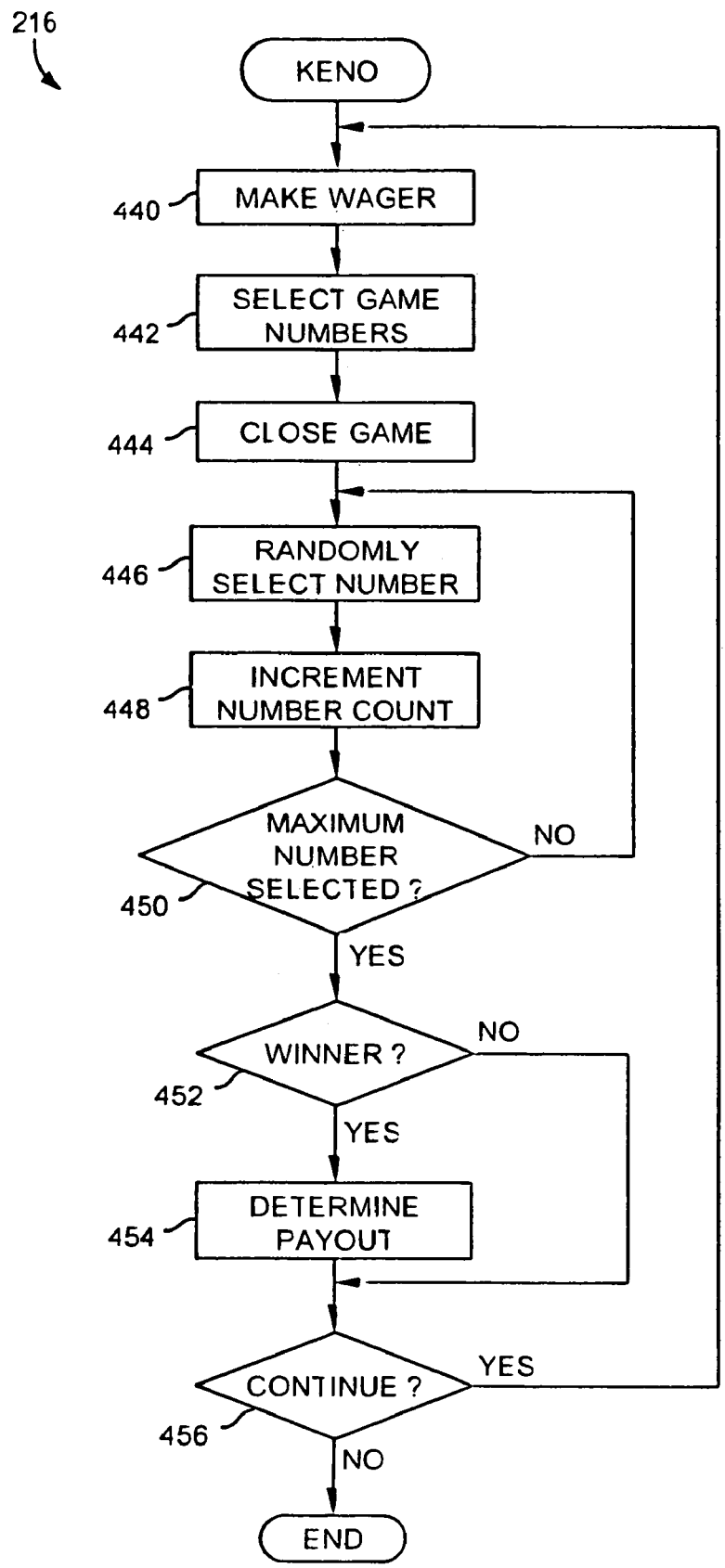
FIG. 14 is an exemplary flow diagram of a video keno routine that may be performed by the controller shown in FIG. 2.

FIG. 14 is an exemplary flow diagram of the video keno routine 216 shown in FIG. 7. The keno routine 216 may be used in connection with a single gaming unit, such as the gaming unit 20, where a single player is playing a keno game, or the keno routine 216 may be used in connection with multiple gaming units where multiple players are playing a single keno game. In the latter case, one or more of the acts described below may be performed either by the controller 60 in each gaming unit or by a central computer to which multiple gaming units are operatively connected, such as by a network or other data link, for example.

As shown in FIG. 14, the video keno routine 216 may begin at block 440 at which a player makes a wager on the outcome of the keno game. After the player has made a wager, at block 442 the player may select one or more game numbers, which may be within a range set by the casino. After selection, the player's game numbers may be stored in the memory of the controller 60.

At block 444, after a certain amount of time, the keno game may be closed to additional players (where a number of players are playing a single keno game using multiple gaming units) and/or additional game numbers for a single player. At block 446, a game number within a range set by the casino may be randomly selected either by the controller 60 or a central computer operatively connected to the controller 60. The randomly selected game number may be displayed on the display device 26 and the display devices of any other gaming units that are involved in the same keno game. At block 448, the controller 60 (or the central computer noted above) may increment a count which keeps track of how many game numbers have been selected at block 446.

At block 450, the controller 60 (or the central computer noted above) may determine whether a maximum number of game numbers within the range have been randomly selected. If not, another game number may be randomly selected at block 446. If the maximum number of game numbers has been selected, at block 452 the controller 60 (or a central computer) may determine whether there are a sufficient number of matches between the game numbers selected by the player and the game numbers randomly selected at block 446 to cause the player to win. The number of matches may depend on how many numbers the player selected and the particular keno rules being used.

If there are a sufficient number of matches, a payout may be determined at block 454 to compensate the player for winning the game. The payout may depend on the number of matches between the game numbers selected by the player and the game numbers randomly selected at block 446. At block 456, the controller 60 may cause a message to be displayed on the display device 26 asking whether the player desires to play another keno game. If the player wishes to play another keno game, the routine 216 may branch back to block 440. If not, the keno routine 216 may end and the controller 60 may cause block 220 of FIG. 7 to be performed.

Figure 16:
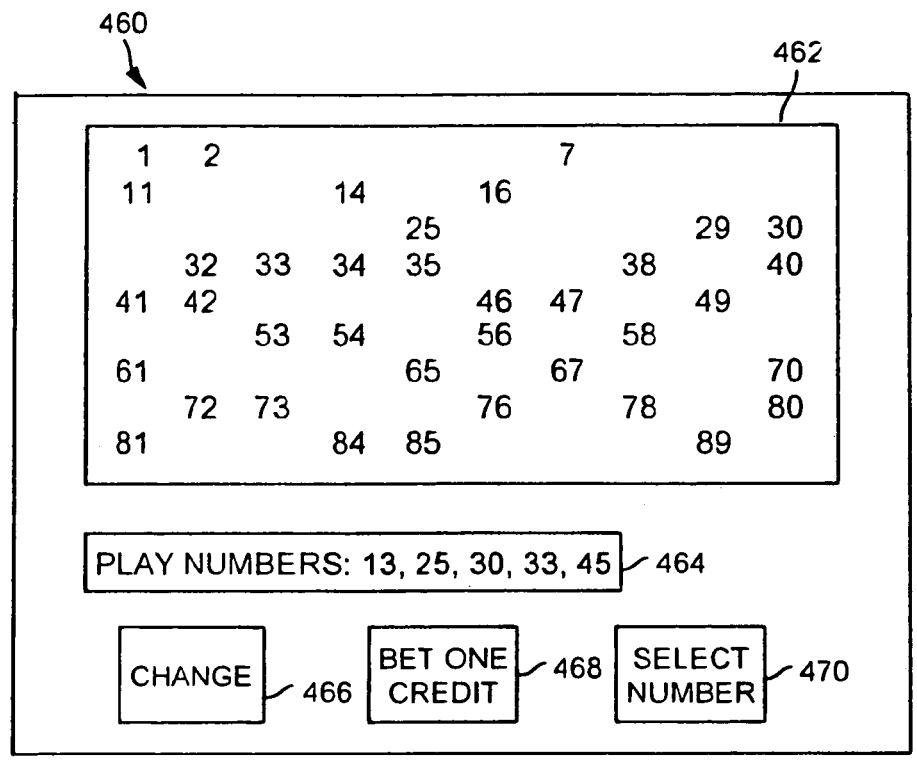
FIG. 16 is an exemplary illustration of a visual display that may be displayed by the gaming device of FIG. 1 when the controller of FIG. 2 performs the video keno routine shown in FIG. 14.

FIG. 16 is an exemplary display 460 that may be shown on the display device 26 during performance of the video keno routine 216. As shown in FIG. 16, the display 460 may include a video image 462 of a plurality of numbers that were selected by the player and a video image 464 of the randomly numbers randomly selected during the keno game. The randomly selected numbers may be displayed in a grid pattern. To allow the player to control the play of the keno game, a plurality of player-selectable button graphics may be displayed, such as a change graphic 466, a bet-one-credit graphic 468, and a select number graphic 470.

Figure 15:
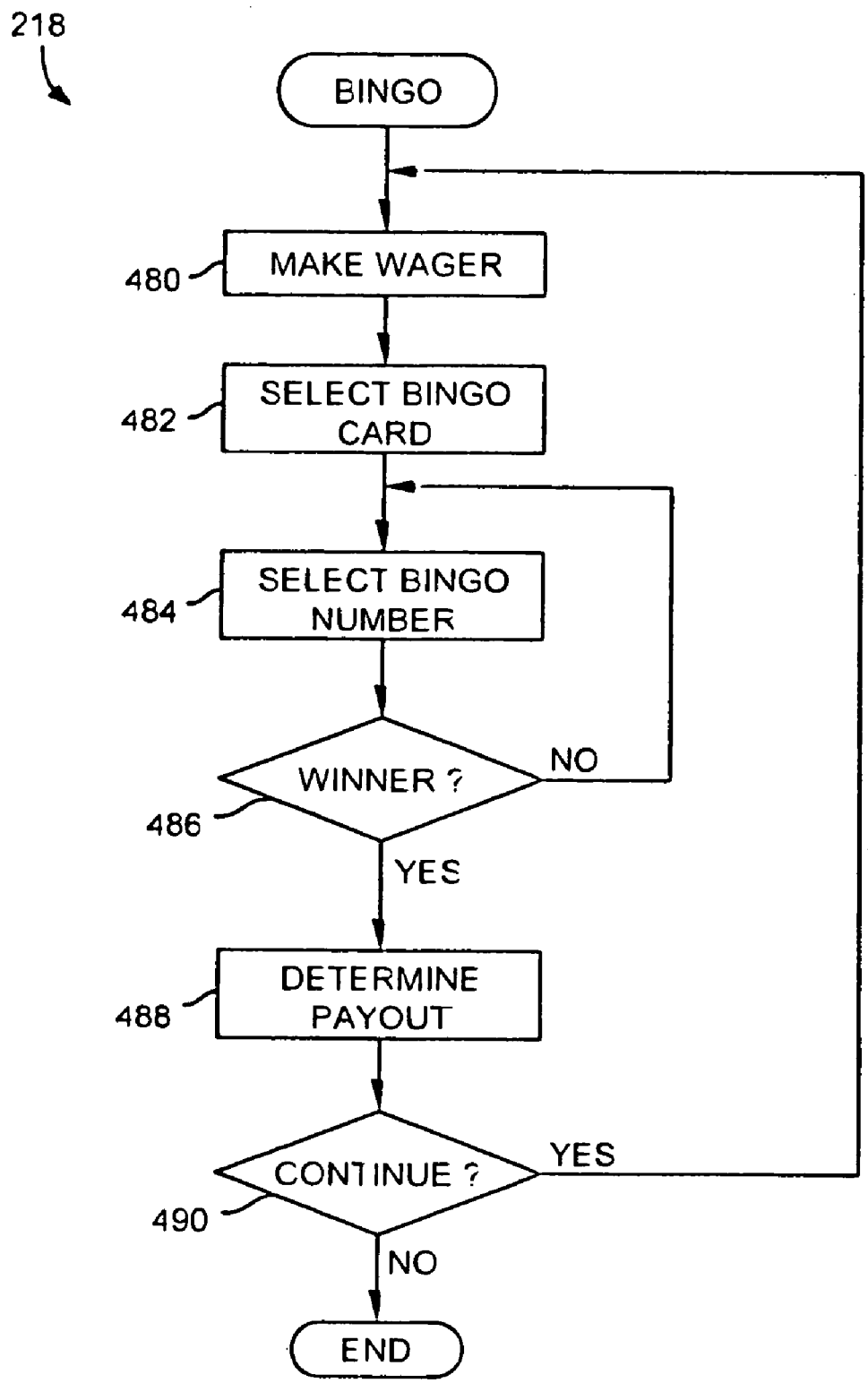
FIG. 15 is an exemplary flow diagram of a video bingo routine that may be performed by the controller shown in FIG. 2.

FIG. 15 is an exemplary flow diagram, of the video bingo routine 218 shown in FIG. 7. The bingo routine 218 may be used in connection with a single gaming unit, such as the gaming unit 20, where a single player is playing a bingo game, or the bingo routine 218 may be used in connection with multiple gaming units where multiple players are playing a single bingo game. In the latter case, one or more of the acts described below may be performed either by the controller 60 in each gaming unit or by a central computer to which multiple gaming units are operatively connected, such as by a network or other data link, for example.

As shown in FIG. 15, at block 480 the controller 60 may prompt a player to make a wager on the outcome of the bingo game by causing a message to be displayed on the display device 26. At block 482, the player may select a bingo card, which may be generated randomly. The player may select more than one bingo card and there may be a maximum number of bingo cards that a player may select. At block 484, a bingo number may be randomly generated by the controller 60 or a central computer. The bingo number may be communicated to the display device 26 and to the display devices of any other gaming units involved in the bingo game.

At block 486, the controller 60 (or a central computer) may determine whether the player has won according to any set of bingo rules. If no player has won, another bingo number may be randomly selected at block 484. At block 486, if a player has bingo (which may be determined by the controller 60) control passes to block 488. At block 488 a payout for the winning player may be determined. The payout may depend on the number of random numbers that were drawn before there was a winner, the total number of winners (if there was more than one player), and the amount of money that was wagered on the game.

Figure 17:
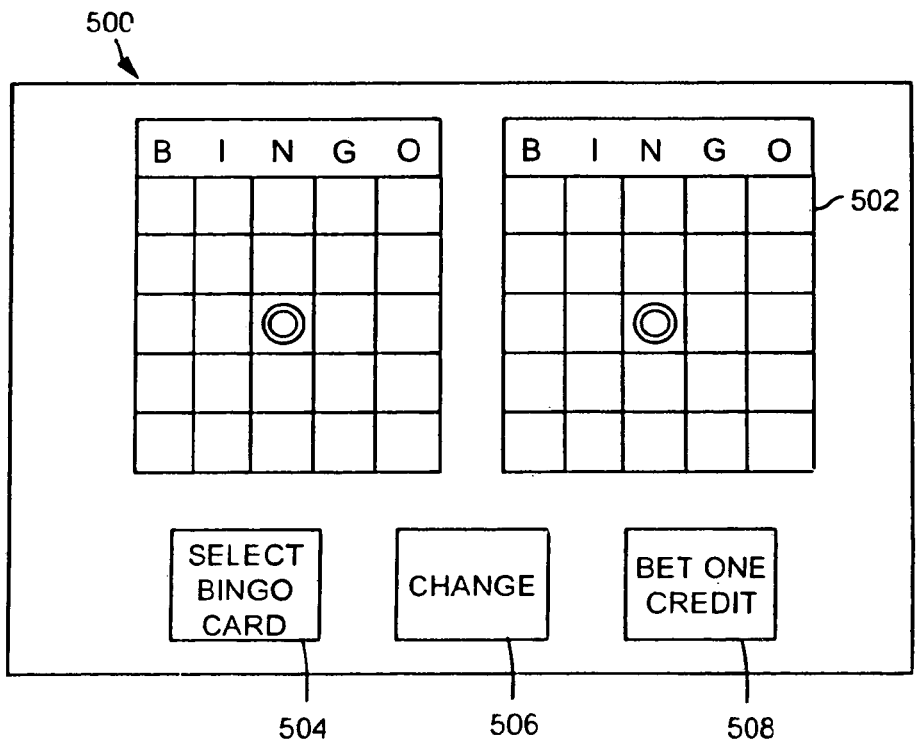
FIG. 17 is an exemplary illustration of a visual display that may be displayed by the gaming device of FIG. 1 when the controller of FIG. 2 performs the video bingo routine shown in FIG. 15.

FIG. 17 is an exemplary display 500 that may be shown on the display device 26 during performance of the video bingo routine 218. As shown in FIG. 17, the display 500 may include a video image 502 of one or more bingo cards and images of the bingo numbers selected during the game. The bingo cards may have a grid pattern. To allow the player to control the play of the video bingo game, a plurality of user-selectable button graphics may be displayed, such as a select bingo card graphic 504, a change graphic 506, and/or a bet one credit graphic 508.

As can be appreciated from the foregoing discussion, the effectiveness and quality of a player's interaction with the gaming device 20 via the touch screen overlay 24 depends on maintaining a one-to-one correspondence and alignment between the touch fields of the touch screen overlay 24 and the graphic images which are displayed on the display device 26. In other words, if a displayed image is not properly aligned with its corresponding or assigned touch field, some portion or all of the image may fall outside of its assigned touch field. As a result, if a player touches the touch screen overlay 24 at a region corresponding to a portion of an image that falls outside of its assigned touch field, the controller 60 may not perform any action or, alternatively, may perform some other undesired action.

As is well known, manufacturing tolerances, vibration and shock during shipping, thermal stresses, component aging, etc. may cause the display field of an electronic display such as, for example, the display device 26, to become misaligned with respect to the physical structure of the display. Thus, if an image is displayed in a fixed location of the display field (i.e., within a fixed range of scan lines and horizontal pixel positions), the actual position of the displayed image as seen by a player with respect to the display surface of the display may vary as a result of tolerances, environmental impacts, etc. Because the touch screen overlay 24 is mechanically fixed to the display surface 80 of the display device 26, any misalignment of the display field causes displayed images to be misaligned with respect to the display surface 80 of the display device 26 (FIG. 3) and, thus, the touch fields of the overlay 24. It should be recognized that the touch fields of the overlay 24 typically remain substantially aligned with the display surface 80 of the display device 26 following an initial factory calibration. To reduce or eliminate the effects of display field or image misalignment, the electronic display alignment technique described herein uses the photosensor 22 to detect the position of an alignment image or object displayed on the display device 26 to align the display field or images to the display surface 80 of the display device 26 and, as a result, to the touch fields of the overlay 24.

Figure 18:
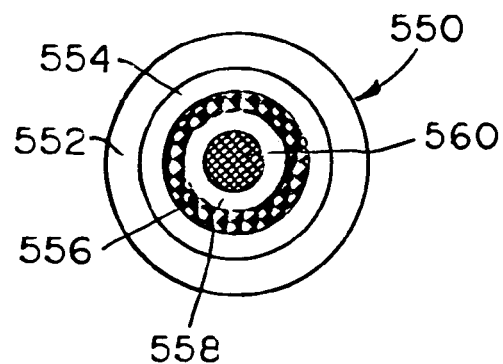
FIG. 18 is an exemplary illustration of an alignment object that may be used to align the video display of the gaming device shown in FIG. 1.

FIG. 18 depicts an exemplary alignment object 550 that may be used to align the display field of the display device 26 to the display surface 80 of the display device 26 and the touch screen overlay 24. As shown in FIG. 18, the exemplary alignment object 550 has a circular geometry including three concentric rings 552–558 surrounding a central region 560. Preferably, but not necessarily, when the object 550 is displayed on the display device 26, each of the rings 552–558 and the central region 560 is configured to have a different characteristic such as, for example, a different light intensity, color, hue and/or pattern, etc. or any combination thereof. Furthermore, as shown in FIG. 18, the intensity, color, hue and/or pattern, etc. may vary within each of the rings 552–558. In this manner, the alignment object 550 provides a plurality of characteristically unique regions which may be electronically detected by the photosensor 22 and identified by the controller 60. It is important to recognize that while the alignment object 550 has a circular geometry (including a plurality of concentric rings), other geometries, patterns, colors, intensity variations, etc. could be used instead without departing from the scope and the spirit of the invention.

Figure 19:
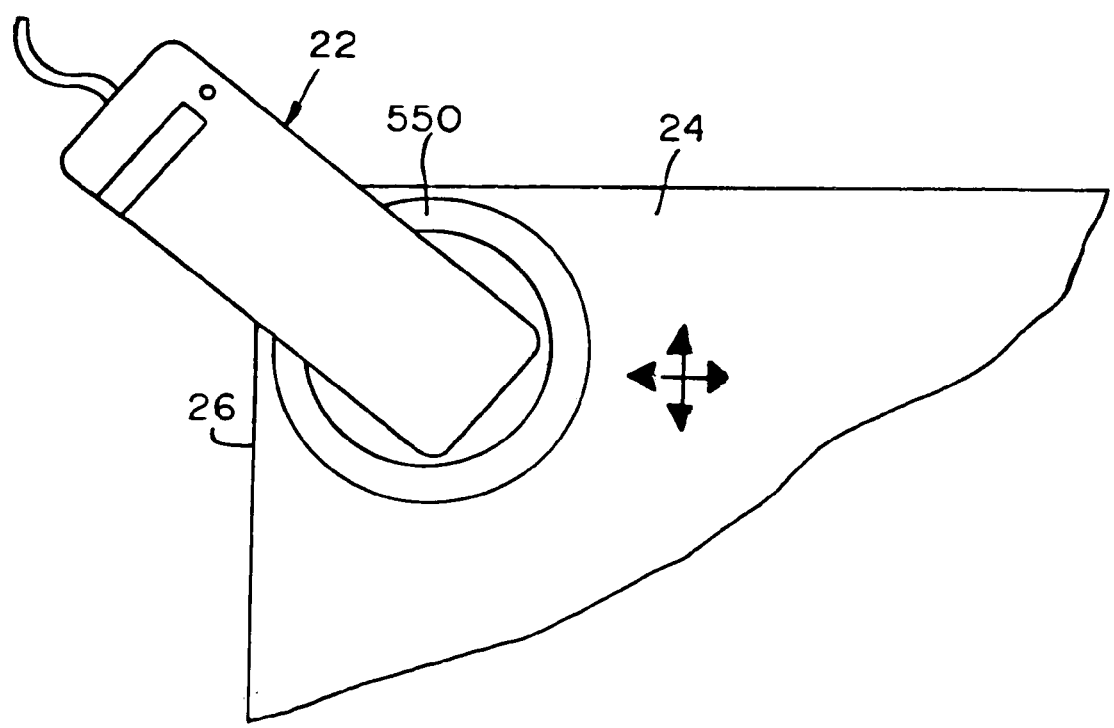
FIG. 19 is an exemplary diagrammatic view that shows the alignment object of FIG. 18 in a substantially aligned condition with respect to the photosensor shown in FIG. 1.

FIG. 19 is an exemplary diagrammatic view that shows the alignment object 550 in a substantially aligned condition with respect to the photosensor 22. Because the photosensor 22 and the touch screen overlay 24 are affixed to the display device 26, alignment of the object 550 with the photosensor 22 causes the display field and, thus, the graphic buttons and other images displayed on the display surface 80 of the display device 26 to be aligned to the touch fields of the touch screen overlay 24.

Figure 20:
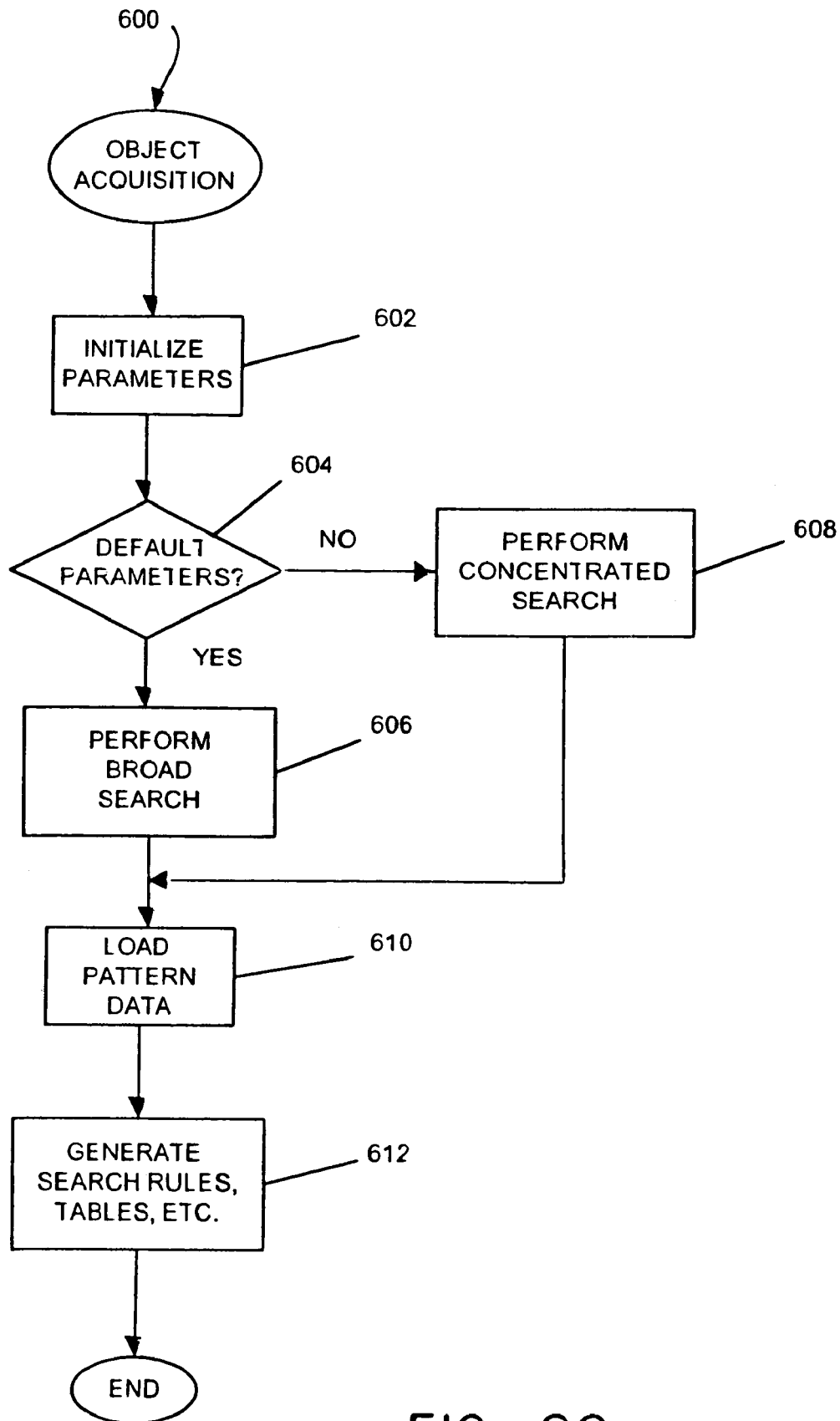
FIG. 20 is an exemplary flow diagram that generally depicts an alignment object acquisition routine that may be performed by the controller of FIG. 2.

FIG. 20 is an exemplary flow diagram that generally depicts an alignment object acquisition routine 600 that may be performed by the controller 60 of the gaming device 20 to cause an alignment object (or at least a portion of an alignment object) to fall within the field of view of the photosensor 22. At block 602, acquisition parameters are initialized based on either default parameters, which may be permanently stored within, for example, the ROM 62 of the controller 60 during manufacture of the gaming device 20, or operational parameters, which may be based on previous field operation of the gaming device 20 and which may be stored within the RAM 64 or any other memory device associated with the controller 60. The initialized acquisition parameters may include alignment information that may be used by the controller 60 to cause the display field of the display device 26 to be located based on the known characteristics of a typical electronic display and also the particular factory calibration parameters used for the display device 26. Additionally, the initialized acquisition parameters may include alignment object characteristics, scan line information, horizontal resolution information (i.e., the number of pixels per scan line), or any other characteristics of the display device 26 that may be used to facilitate acquisition of an alignment object.

Block 604 determines whether the parameters initialized by block 602 are default parameters or operational parameters. If default parameters have been used to initialize the display device 26, then block 606 performs a broad search check. Otherwise, if operational parameters have been used to initialize the display device 26, block 608 performs a concentrated search check. Block 606 may perform the broad search check by systematically moving the display field of the display device 26 so that the entire display field may be moved through the field of view of the photosensor 22. Once the controller 60 recognizes that at least a portion of an alignment object is within the field of view of the photosensor 22 (i.e., has been acquired by the photosensor 22), block 606 terminates its search and control passes to block 610. The controller 60 may use known alignment object characteristics (which may be stored as pattern data in the controller 60) to determine when a portion of the alignment object is within the field of view of the photosensor 22. In particular, the controller 60 may recognize particular light intensities, colors, hues, patterns, etc. or combinations thereof as being indicative of the presence of the desired alignment object. However, in some cases, the characteristics of the alignment object may not be known in advance by the controller 60. Instead, the controller 60 may only know in advance the general location of the alignment object based on scan line information, horizontal pixel locations, etc. associated with the display field. Alternatively or additionally, the controller 60 may use stored signature information (which may be provided by block 602) to determine whether a specific desired alignment object is within the field of view of the photosensor 22.

The concentrated search check performed by block 608 may be similar in principal to that used by block 606, but may instead limit the range over which the display field of the display device 26 may be moved, thereby enabling a more rapid acquisition of the alignment object by the photosensor 22 than typically achieved by the broad search performed by block 606. After block 608 completes its concentrated search check, control passes to block 610.

Block 610 loads pattern data associated with the alignment object into the memory of the controller 60. In the case of an alignment object that is known a priori by the gaming device 20, which is typically but not necessarily the case, the pattern data may be retrieved from the ROM 64 and stored in the RAM 66 for use by the processor 64. Alternatively, in the case of an alignment object for which the characteristics are not known a priori by the gaming device 20, block 610 may move the display field of the display device 26 to enable the photosensor 22 to detect and store (i.e., acquire) the characteristics (i.e., the pattern data) of the alignment object in the RAM 66. After the pattern data of the alignment object has been loaded into memory, block 612 may generate search rules, tables, etc. to be used by the controller 60 to align the alignment object with the photosensor 22 as described in greater detail below.

Figure 21:
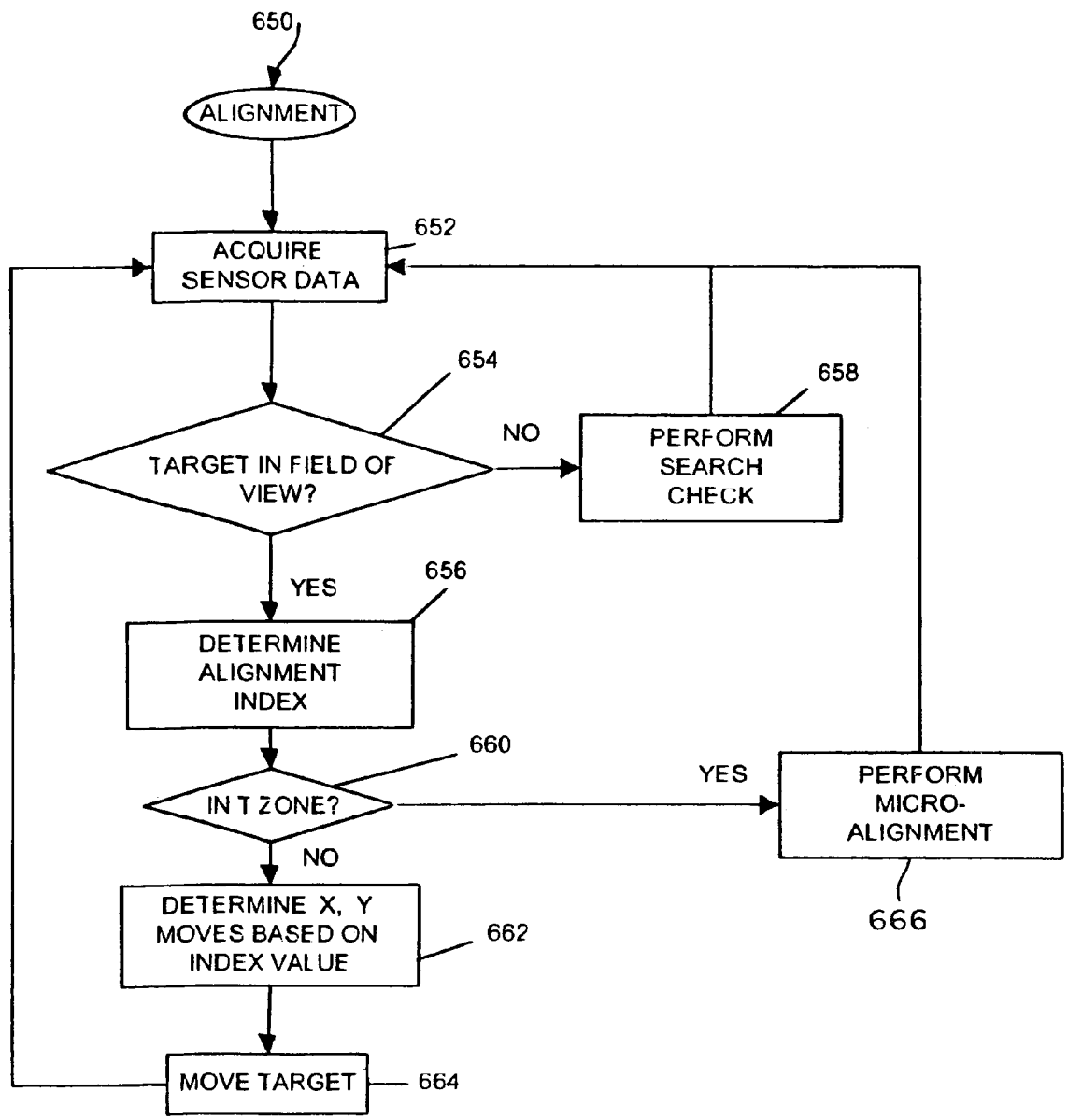
FIG. 21 is an exemplary flow diagram that generally depicts an alignment routine that may be performed by the controller of FIG. 2.

FIG. 21 is an exemplary flow diagram that generally depicts an alignment routine 650 that may be performed by the controller 60 of the gaming device 20 to align an alignment object with the photosensor 22. At block 652, the controller 60 uses the A/D converter 69 to convert electrical signals received via the photosensor 22 and the signal conditioning block 76 into digital information which, as discussed above, may be representative of a light intensity value, a color, a hue, a pattern, etc. Block 654 uses the acquired sensor data (i.e., the digital information) to determine whether an alignment object is within the field of view of the photosensor 22. By way of example only, block 654 may compare the acquired sensor data to alignment object pattern data stored in the memory of the controller 60 by block 610 of FIG. 20. In particular, if the acquired sensor data is light intensity data, block 654 may compare the acquired intensity data to stored intensity information (i.e., pattern data) associated with the alignment object. If the acquired intensity data matches the intensity and/or pattern of any region within the alignment object, then block 654 may determine that the alignment object is within the field of view of the photosensor 22 and pass control to block 656. On the other hand, if block 654 determines that the alignment object is not within the field of view of the photosensor 22, block 658 may perform a search check to reacquire the alignment object using, for example, one or both of the search checks performed by blocks 606 and 608 of FIG. 20.

Block 656 determines an alignment index based on a comparison of the acquired sensor data to known or stored pattern data. In general, the alignment index is a numerical value that indicates the relative alignment between the photosensor 22 and the alignment object being displayed by the display device 26. By way of example, the alignment index may correspond to a numerical value that is assigned to each of the distinct regions that make up the alignment object. Thus, an alignment object may, for example, have thirteen distinct regions corresponding to index values 1 through 13. As a result, when the field of view of the photosensor 22 coincides with a region within an alignment object, block 656 compares the acquired sensor data to the known properties of each of the possible regions (which may be stored as pattern data within the memory of the controller 60) and thereby determines which region coincides with the field of view of the photosensor 22. Once block 656 has determined which region is within the field of view of the photosensor 22, block 656 may generate the index value that has been assigned to that particular region. Alternatively or additionally, the alignment index may be based on the degree to which a pattern within the alignment object is aligned in a predetermined manner within the field of view of the photosensor 22. For example, in the case where the photosensor 22 uses multiple pixels arranged in a matrix, array, etc., the alignment index may be calculated as the number of pixels within the photosensor 22 that match a predetermined desired alignment pixel pattern stored in memory of the controller 60.

Block 660 checks the alignment index to determine if the field of view of the photosensor 22 lies within a target alignment region or, in the case of an alignment index that is based on a pattern match, block 660 determines if the acquired sensor data pattern substantially matches a desired target pattern. If the field of view of the photosensor 22 lies within the target alignment region or if there is a substantial pattern match, block 666 performs a micro-alignment. The micro-alignment process performed by block 666 may be used to further refine the alignment between the alignment object and the photosensor 22. By way of example, a central region of the alignment object (such as the central region 560 of the alignment object 550 shown in FIG. 18) may have a distinctive pattern that facilitates a more precise alignment of the alignment object and the photosensor 22. In particular, as shown in FIG. 18, the central region 560 of the alignment object may include a checkerboard pattern having a plurality of squares that vary in intensity and/or color. Thus, the micro-alignment block 666 may use the photosensor 22 to determine the number of squares extending across the diameter of the central region 560, thereby enabling the micro-alignment block 666 to move the display field of the display device 26 so that the approximate center of the central region 560 coincides with the center of the field of view of the photosensor 22. However, it should be recognized that while a checkerboard pattern is shown within the central region 560 of the alignment object 550, any other suitable pattern may be used instead without departing from the scope and the spirit of the invention.

If block 660 determines that the field of view of the photosensor 22 does not coincide with the target alignment region (e.g., the central region 560), control passes to block 662. As described in greater detail below in connection with FIGS. 22–25, block 662 may use the alignment index to determine the change in the x and y coordinates (i.e., the delta x and delta y) to be used to move the display field within the display device 26 toward an aligned condition. Block 664 uses the delta x and delta y values to shift the display field (and, thus, the alignment object) and control returns to block 652.

Figure 22:
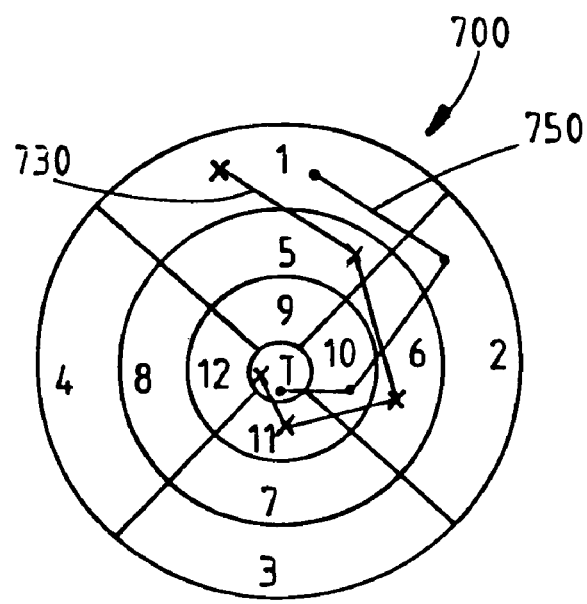
FIG. 22 is an exemplary diagrammatic view of an alignment object and search paths that may be used to align the display of the gaming device shown in FIG. 1.

FIG. 22 is a diagrammatic view of an alignment object 700 having a circular geometry. As shown in FIG. 22, the alignment object 700 may be subdivided into twelve concentrically arranged regions, which are numbered one through twelve, and a central target region, which is labeled "T." Each of the concentric regions (i.e., the regions one through twelve) may be displayed on the display device 26 using a different light intensity, color, hue, and/or pattern, etc. or any combination thereof and the central target region may use a thirteenth distinct intensity or, alternatively, may use a pattern along with different intensities, colors, etc. such as that used within the central region 560 of the alignment object 550 shown in FIG. 18.

Figure 23:
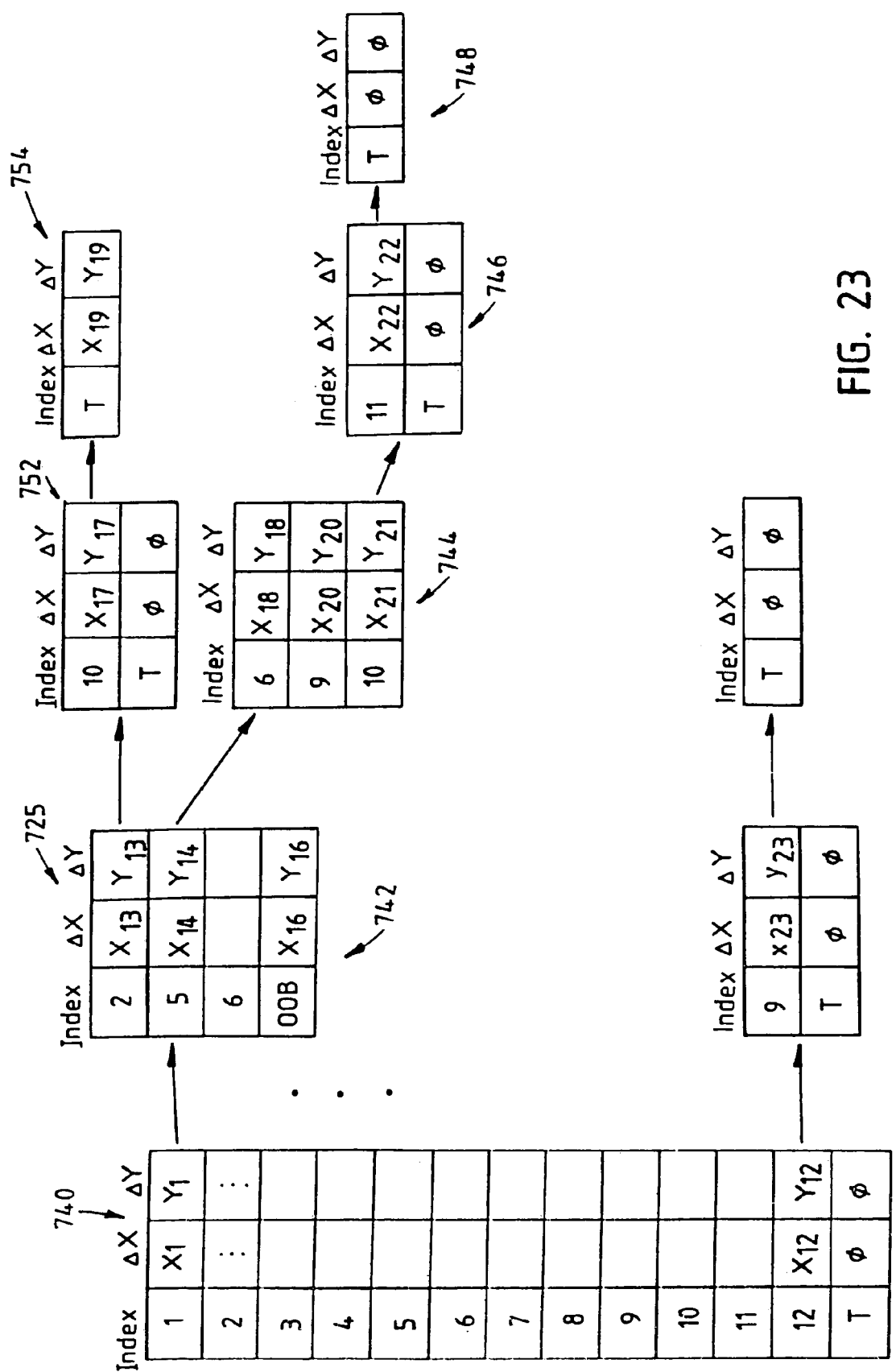
FIG. 23 is a diagrammatic illustration of a plurality of linked tables that define search rules which may be used by the alignment routine of FIG. 21.

FIG. 23 is a diagrammatic illustration of a plurality of linked tables 725 that define search rules or procedures which may be used by block 662 (FIG. 21) to determine the manner in which the display field of the display device 26 may be moved to achieve substantial alignment of the alignment object 700 with the photosensor 22. Generally speaking, the search rules or procedures defined by the tables 725 may be represented as a conditional tree structure, whereby the known properties of the alignment object 700 and the previous delta x and delta y moves of the display field are used to select the next x and y deltas for moving the object 700 toward substantial alignment with the photosensor 22. More specifically, the geometry of the object 700, the geometries of the regions within the object 700 and the previous x and y deltas or path are used to determine the sequence of x and y deltas that will result in substantial alignment of the object 700 with the photosensor 22. Thus, given an initial alignment index (i.e., upon acquisition of the alignment object 700 by the photosensor 22), the tables 725 may be used to determine a likely sequence of x and y delta moves that will cause the object 700 to become aligned with the photosensor 22.

By way of example, one sequence of x and y deltas or path that results when the alignment routine 650 shown in FIG. 21 uses the linked tables 725 is shown at reference numeral 730 (FIG. 22). As shown in FIG. 22, the field of view of the photosensor 22 initially lies within region one of the alignment object 700. Thus, block 656 determines that the alignment index is one and block 660 determines that the field of view of the photosensor 22 is not aligned with the central region "T." Block 662 may then use table 740 to determine that delta x and y should be x1 and y1, respectively, and block 664 moves the display field of the display device 26 delta x1 and y1. It is important to recognize that because the characteristics of the alignment object 700 may be precisely known (i.e., they may be stored as pattern data within the controller 60), the move x1, y1 from region one results in a limited number of possible second locations for the field of view of the photosensor 22. As shown in table 742, a move of x1, y1 from region one may result in a second location (or alignment index) of 2, 5, 6 or an out-of-bounds (OOB) location. Thus, the known properties of the alignment object 700 and the knowledge of the previous delta x and y moves reduces the number of possible second locations to those shown in table 742. For the path 730 shown in FIG. 22, the second location that results from a move x1, y1 lies within region five. Using table 742 and an alignment index of five, the alignment routine 650 moves the display x14, y14. As shown in table 744, a move of x14, y14 from region five can result in a third possible location within regions 6, 9 or 10. In the case of the path 730, the third location lies within region six. Using table 744 and an alignment index of six, the alignment routine 650 moves the display x18, y18, which results in a fourth location that lies within region eleven. As shown in table 746, a move from region six (given the historical moves along the path 730) results in a fourth location that lies within the central target region "T" or region eleven. Using table 746 and an alignment index of eleven, the alignment routine 650 moves the display x22, y22, which results in a fifth location that falls within the central target region "T" as shown in table 748. Once substantial alignment has been achieved by the routine 650, the micro-alignment block 666 may perform further refined alignment of the object 700 with the photosensor 22 as described above.

Another path having an initial location within region one that is different from the initial location of the path 730 is indicated generally at reference numeral 750. The path 750 may be tracked through tables 740, 742, 752 and 754 in a manner similar to the manner in which the path 730 may be tracked through the tables 725. In any event, both the paths 730 and 750 take the form of a spiral reduction search rule, as can be seen by the general shape of the paths 730 and 750. A spiral reduction search rule may be embedded within the tables 725 by selecting appropriate x and y deltas with knowledge of the properties of the alignment object 700 and the delta x and y history. Of course, any other desired search strategy may be embodied within the tables 725 without departing from the scope of the invention.

It should be recognized that while the alignment technique shown in FIGS. 22 and 23 may allow the controller 60 to rapidly sequence through a plurality of linked tables to reach a condition of substantial alignment between an alignment object and the photosensor 22, the failure to include a possible outcome (i.e., location or region) of an x, y move may result in a non-convergent condition, which may prevent substantial alignment of the object 700 with the photosensor 22. In other words, the technique shown in FIGS. 22 and 23 depends on a priori knowledge of all possible paths to a substantial alignment condition for any given starting point within each of the regions of the alignment object 700. As a result, the failure to include or complete one or more possible paths within the tables 725 may prevent convergence to a substantial alignment condition.

Figure 24:
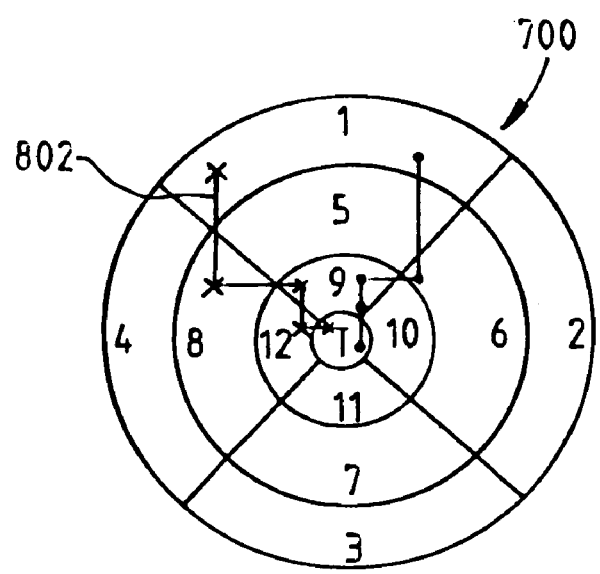
FIG. 24 is another exemplary diagrammatic view of an alignment object and search paths that may be used to align the display of the gaming device shown in FIG. 1.

FIGS. 24 and 25 are exemplary diagrammatic views that illustrate another manner in which the x and y delta moves may be determined by block 662 of FIG. 21. Generally speaking, the technique shown in FIGS. 24 and 25 uses a single search rule table 800 that may be adaptively updated during successive iterations of the alignment routine 650 and, in particular, successive passes through block 662. Initial selections for the x and y delta moves that correspond to each of the indexes (i.e., one through twelve) may be made based on the characteristics of the object 700. For purposes of illustration, the x and y delta moves in the table 800 are shown as variables for which actual initial values may be selected as desired to suit a particular application, alignment object characteristics, etc.

A search path 802 shown in FIG. 24 has an initial location in region one (i.e., the field of view of the photosensor 22 coincides with region one). Accordingly, block 662 moves the display field of the display device 26 zero, −y1, which are the x, y delta moves that correspond to the region or index one in the table 800. The second location of path 802 lies within region eight and block 662 uses the table 800 to move the display k1x1, zero, which causes the field of view of the photosensor 22 to lie within region nine. In a similar manner, the alignment routine 650 uses the table 800 to move the display so that the field of view of the photosensor 22 moves through a fourth location within region twelve and reaches a condition of substantial alignment with the alignment object 700 (i.e., the field of view of the photosensor 22 lies within the central region "T") when the display is moved a fifth time. Thus, the alignment routine 650 may use the table 800 multiple times in an iterative manner to achieve a condition of substantial alignment between the alignment object 700 and the field of view of the photosensor 22. Preferably, but not necessarily, the initial values for the coefficients k1 and k2 are greater than zero and less than or equal to one and the initial values for the x and y delta moves are selected based on the characteristics of the particular alignment object being used.

In some applications it may be desirable to dynamically adjust the coefficients k1 and k2 and/or the x and y deltas x1 and y1 to guarantee convergence or substantial alignment between the field of view of the photosensor 22 and the central target region "T" of the alignment object 700. Such dynamic adjustment of indexes may be used where the characteristics of the alignment object are not completely known, or are not known at all. This approach enables search rules to be dynamically developed for any given alignment object having unknown properties.

Other dynamic search rules may use equations instead of one or more tables to determine appropriate x and y delta moves for the display device 26. Such dynamic equations may calculate a next delta x and y based on a previous delta x and y, the current location of the field of view of the photosensor 22 within an alignment object, the previous location of the field of view of the photosensor 22, a change in intensity, color, hue, pattern, etc. In any event, a variety of dynamic search techniques that may be used instead are well known in the art and, thus, will not be described in greater detail herein.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus, comprising:
   a housing;
   a display unit that is capable of generating video images and mounted in the housing,
   the display unit having a display area;
   a touch-sensitive input device disposed overlaying a portion of the display unit;
   a sensor disposed overlaying a portion of the touch sensitive input device and having a field of view;
   a value input device associated with the housing; and a controller disposed in the housing and operatively coupled to the display unit, the touch-sensitive input device, the sensor and the value input device, the controller comprising a processor and a memory operatively coupled to the processor, the controller being programmed to allow a person to make a wager, the controller being programmed to cause a first video image to be generated on the display unit, the first video image representing a game and including at least one user input area, the controller being programmed to determine a value payout associated with an outcome of the game;

the controller being programmed to cause a second video image to be generated on the display unit, the second video image being larger than the field of view of the sensor and smaller than the display area, having a spatial relationship to the at least one user input area of the first video image and including a plurality of regions each having at least one unique characteristic relative to the other regions of the plurality of regions, the plurality of regions with at least one target region;

the controller being programmed to receive a signal from the sensor;

the controller being programmed to determine if at least one of the plurality of regions is within the field of view of the sensor;

the controller being programmed to alter the position of the first and second video images until at least one of the plurality of regions is within the field of view of the sensor;

the controller being programmed to determine which of the plurality of regions is within the field of view of the sensor; and the controller being programmed to alter the position of the first and second video images relative to the sensor until the at least one target region is within the field of view of the sensor.

2. The gaming apparatus according to claim 1, wherein:
the at least one unique characteristic being at least one of an intensity, a color, a hue and a pattern; and
the controller being programmed to determine which of the plurality of regions is within the field of view of the sensor according to the at least one unique characteristic.

3. The gaming apparatus according to claim 1, wherein:
the controller is programmed to receive a signal from the sensor that is associated with at least one of the plurality of regions other than the at least one target region;
the controller is programmed to determine the identity of the at least one of the plurality of regions other than the at least one target region;
the controller is programmed to refer to a table for a change in position for the first and second video images that is dependent upon the identity of the at least one of the plurality of regions other than the at least one target region; and
the controller is programmed to alter the position of the first and second video images relative to the sensor according to the change in position from the table.

4. The gaming apparatus according to claim 3, wherein:
the controller is programmed to receive another signal from the sensor that is associated with at least one other of the plurality of regions other than the at least one target region;

the controller is programmed to determine the identity of the at least one other of the plurality of regions other than the at least one target region;

the controller is programmed to refer to another table for another change in position for the first and second video images that is directly dependent upon the identity of the at least one other of the plurality of regions other than the at least one target region and indirectly dependent upon the identity of the at least one of the plurality of regions; and the controller is programmed to alter the position of the first and second video images relative to the sensor according to the another change in position from the another table.

5. The gaming apparatus according to claim 4, wherein the change and the another change are in the form of a horizontal shift and a vertical shift.

6. The gaming apparatus according to claim 4, wherein:
the at least one unique characteristic being at least one of an intensity, a color, a hue and a pattern; and
the controller being programmed to determine one of the identity of the at least one of the plurality of regions and the identity of the at least another of the plurality of regions according to the at least one unique characteristic.

7. The gaming apparatus according to claim 4, wherein:
the controller is programmed to receive a signal from the sensor that is associated with at least one target region;
the controller is programmed to determined a characteristic of the at least one target region;
the controller is programmed to alter the position of the first and second video images relative to the sensor according to the characteristic of the at least one target region.

8. The gaming apparatus according to claim 7, wherein the controller is programmed to receive a signal;
the controller is programmed to determine a dimension of the at least one target region within the field of view of the sensor according to the received signal; and
the controller is programmed to alter the position of the first and second video images relative to the sensor according to the dimension of the at least one target region within the field of view of the sensor.

9. The gaming apparatus according to claim 1, wherein the sensor comprises one or more charge coupled devices.

10. The gaming apparatus according to claim 1, wherein the controller is programmed to cause a first video image representing a game to be generated on the display unit, the video image representing one of the following games: video poker, video blackjack, video slots, video keno and video bingo,
the video image comprising an image of at least five playing cards if the game comprises video poker,
the video image comprising an image of a plurality of simulated slot machine reels if the game comprises video slots,
the video image comprising an image of a plurality of playing cards if the game comprises video blackjack,
the video image comprising an image of a plurality of keno numbers if the game comprises video keno, and
the video image comprising an image of a bingo grid if the game comprises video bingo.

11. The gaming apparatus according to claim 1, wherein the controller is programmed to cause a first video image to be generated on the display unit, the video image comprising a plurality of simulated slot machine reels of a slots game, each of the slot machine reels having a plurality of slot machine symbols.

12. A method comprising:
receiving a wager,
causing a first video image to be generated on a display unit having a display area, the first video image representing a game and including at least one user input area,
determining a value payout associated with an outcome of the game;
causing a second video image to be generated on the display unit, the second video image being larger than the field of view of a sensor and smaller than the display area, having a spatial relationship to the at least one user input area of the first video image and including a plurality of regions each having at least one unique characteristic relative to the other regions of the plurality of regions, the plurality of regions with at least one target region;
receiving a signal from the sensor;
determining if at least one of the plurality of regions is within the field of view of the sensor;
altering the position of the first and second video images until at least one of the plurality of regions is within the field of view of the sensor;
determining which of the plurality of regions is within the field of view of the sensor; and
altering the position of the first and second video images relative to the sensor until the at least one target region is within the field of view of the sensor.

13. The method according to claim 12, wherein the at least one unique characteristic being at least one of an intensity, a color, a hue and a pattern, the method comprising:
determining which of the plurality of regions is within the field of view of the sensor according to the at least one unique characteristic.

14. The method according to claim 12, comprising
receiving a signal from the sensor that is associated with at least one of the plurality of regions other than the at least one target region;
determining the identity of the at least one of the plurality of regions other than the at least one target region;
referring to a table for a change in position for the first and second video images that is dependent upon the identity of the at least one of the plurality of regions other than the at least one target region; and
altering the position of the first and second video images relative to the sensor according to the change in position from the table.

15. The method according to claim 14, wherein:
receiving another signal from the sensor that is associated with at least one other of the plurality of regions other than the at least one target region;
determining the identity of the at least one other of the plurality of regions other than the at least one target region;
referring to another table for another change in position for the first and second video images that is directly dependent upon the identity of the at least one other of the plurality of regions other than the at least one target region and indirectly dependent upon the identity of the at least one of the plurality of regions; and
altering the position of the first and second video images relative to the sensor according to the another change in position from the another table.

16. The method according to claim 15, wherein the change and the another change are in the form of a horizontal shift and a vertical shift.

17. The method according to claim 15, wherein the at least one unique characteristic being at least one of an intensity, a color, a hue and a pattern, the method comprising:
determining one of the identify of the at least one of the plurality of regions and the identity of the at least another of the plurality of regions according to the at least one unique characteristic.

18. The method according to claim 15, wherein:
receiving a signal from the sensor that is associated with at least one target region;
determining a characteristic of the at least one target region;
altering the position of the first and second video images relative to the sensor according to the characteristic of the at least one target region.

19. The method according to claim 18, wherein
receiving a signal;
determining a dimension of the at least one target region within the field of view of the sensor according to the received signal; and
altering the position of the first and second video images relative to the sensor according to the dimension of the at least one target region within the field of view of the sensor.

20. The method according to claim 12, comprising causing a first video image representing a game to be generated on the display unit, the video image representing one of the following games: video poker, video blackjack, video slots, video keno and video bingo,
the video image comprising an image of at least five playing cards if the game comprises video poker,
the video image comprising an image of a plurality of simulated slot machine reels if the game comprises video slots,
the video image comprising an image of a plurality of playing cards if the game comprises video blackjack,
the video image comprising an image of a plurality of keno numbers if the game comprises video keno, and
the video image comprising an image of a bingo grid if the game comprises video bingo.

21. The method according to claim 12, comprising causing a first video image to be generated on the display unit, the video image comprising a plurality of simulated slot machine reels of a slots game, each of the slot machine reels having a plurality of slot machine symbols.

* * * * *

UNITED STATES PATENT AND TRADEMARK OFFICE
CERTIFICATE OF CORRECTION

PATENT NO. : 7,161,589 B2 Page 1 of 1
APPLICATION NO. : 10/937715
DATED : January 9, 2007
INVENTOR(S) : David H. Muir It is certified that error appears in the above-identified patent and that said Letters Patent is hereby corrected as shown below:

In the Claims:

At Column 18, line 65, "touch sensitive" should be -- touch-sensitive --.

At Column 20, line 22, "identify" should be -- identity --.

At Column 20, line 29, "determined" should be -- determine --.

At Column 22, line 14, "identify" should be -- identity --.

Signed and Sealed this

Twenty-fifth Day of December, 2007

JON W. DUDAS
*Director of the United States Patent and Trademark Office*